US 6,728,233 B1

(12) United States Patent
Park et al.

(10) Patent No.: US 6,728,233 B1
(45) Date of Patent: Apr. 27, 2004

(54) PROCESSING PACKET DATA IN MOBILE COMMUNICATION SYSTEM

(75) Inventors: Jin-Soo Park, Seoul (KR); Young-Ky Kim, Seoul (KR); Joong-Ho Jeong, Seoul (KR)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/354,707

(22) Filed: Jul. 16, 1999

(30) Foreign Application Priority Data

Jul. 16, 1998 (KR) .......................................... 98-28975
Aug. 5, 1998 (KR) .......................................... 98-32352
Aug. 14, 1998 (KR) .......................................... 98-33360

(51) Int. Cl.$^7$ ................................................ H04B 7/00
(52) U.S. Cl. ...................... 370/342; 370/335; 370/468; 455/69; 455/522
(58) Field of Search ........................ 455/69, 522, 67.1, 455/455; 370/335, 342, 441, 468, 442, 336, 337, 320, 321

(56) References Cited

U.S. PATENT DOCUMENTS

| | | | | | |
|---|---|---|---|---|---|
| 5,559,789 A | * | 9/1996 | Nakano et al. | ............. | 370/342 |
| 5,734,646 A | * | 3/1998 | I et al. | ............. | 370/252 |
| 5,790,592 A | * | 8/1998 | Baik | ............. | 370/342 |
| 5,914,959 A | * | 6/1999 | Marchetto et al. | ............. | 370/468 |
| 5,933,781 A | * | 8/1999 | Willenegger et al. | ............. | 370/342 |
| 6,035,209 A | * | 3/2000 | Tiedemann et al. | ............. | 455/115 |
| 6,035,210 A | * | 3/2000 | Endo et al. | ............. | 455/522 |
| 6,141,353 A | * | 10/2000 | Li | ............. | 370/465 |
| 6,219,343 B1 | * | 4/2001 | Honkasalo et al. | ............. | 370/335 |
| 6,317,413 B1 | * | 11/2001 | Honkasalo | ............. | 370/342 |
| 6,377,809 B1 | * | 4/2002 | Rezaiifar et al. | ............. | 370/335 |
| 6,381,229 B1 | * | 4/2002 | Narvinger et al. | ............. | 370/328 |

FOREIGN PATENT DOCUMENTS

| JP | 08-340308 | 12/1996 |
|---|---|---|
| JP | 09-186646 | 7/1997 |

OTHER PUBLICATIONS

Japanese Office Action dated Feb. 4, 2003, issued in a counterpart application, namely Appln. No. 2000–560739.

* cited by examiner

*Primary Examiner*—Edward F. Urban
*Assistant Examiner*—Simon Nguyen
(74) *Attorney, Agent, or Firm*—Dilworth & Barrese LLP

(57) ABSTRACT

A packet data processing device for a mobile communication system. A base station includes a channel status information receiver for receiving channel status information for a forward channel from a mobile station; a supplemental channel transmission controller for determining a bit rate of the mobile station according to the channel status information, a supplemental channel transmitter for transmitting data to the mobile station at the bit rate determined by the supplemental channel transmission controller; and a rate indicator transmitter for generating a rate indicator having information about the determined bit rate and transmitting the generated rate indicator to the mobile station. The mobile station includes a channel status measurer for detecting power of a signal received over a pilot channel to measure channel status; a channel status information transmitter for generating channel status information according to the measured channel status and transmitting the channel status information to a base station; and a supplemental channel receiver for detecting a bit rate of data transmitted at a variable rate from the base station and receiving data at the detected bit rate.

17 Claims, 28 Drawing Sheets

PROCESSING PACKET DATA IN MOBILE COMMUNICATION SYSTEM

BACKGROUND OF THE INVENTION

1. Field of the Invention

The present invention relates generally to a mobile radio communication system, and in particular, to a method for processing data by varying the power and bit rate according to a channel condition between a base station and a mobile station and the required quality of service (QoS).

2. Description of the Related Art

The IS-95 standard supports a real-time voice data service which is called a circuit service. Circuit services can be viewed as a special case of packet services in the sense that dedicated traffic and control channels are typically assigned to the mobile station for extended periods of time during circuit service sessions. This will lead to less efficient use of the air interface capacity. However, some delay sensitive services such as video applications require a dedicated channel for the duration of the call. The circuit service may be characterized in that it sends input circuit data consecutively. In contrast to the IS-95 standard, a mobile communication system based on the IMT-2000 standard, supporting a high bit rate, can provide a packet data service for large quantity data, such as a moving picture and an image, using a supplemental channel. The packet data is transmitted as inconsecutive burst data, whereas the circuit data based on the IS-95 standard is transmitted as consecutive voice data. Further, for the packet data service defined by the IMT-2000 standard, it is required to maximize throughput while satisfying various bit rates required by users. In contrast, in the IS-95, for the voice server, it is required to provide a uniform service to all the users irrespective of the channel condition. To satisfy the IS-95 uniform service requirement, the system allocates higher power to a mobile station under a bad channel condition. However, such a method cannot be used to maximize the data throughout for the packet data service.

When the consecutive data processing method for the circuit service is applied to the packet service which transmits data inconsecutively, it is difficult to maximize a bit rate of the packet data, thus causing a decrease in data processing efficiency and channel efficiency.

In addition, the aforementioned data processing problem occurs even during a handoff. That is, a handoff method in an existing mobile communication system providing the circuit service combines or selects the same data transmitted simultaneously from at least two mobile stations concerned in the handoff. When this handoff method is applied to the packet service, it is difficult to adaptively optimize a bit rate according to the channel condition, thus causing a reduction in packet throughput. Therefore, to provide a packet data service, the data transmission method and the handoff method should be redesigned to satisfy transmission characteristics of the packet data. In particular, there is required a new method for allocating power of the forward link to a mobile station and establishing a data path passing through the base station.

SUMMARY OF THE INVENTION

It is, therefore, an object of the present invention to provide a data processing method for packet data communication in a mobile communication system, in which a mobile station estimates a channel condition using a signal transmitted from a base station and transmits channel status information to the base station, and the base station then allocates higher power for a mobile station in a good channel condition depending on the channel status information and transmits data to the mobile station with the allocated power.

It is another object of the present invention to provide a data processing method for packet data communication in a mobile communication system, in which a mobile station estimates a channel condition using a signal transmitted from a base station and transmits channel status information to the base station, and the base station then transmits data to a mobile station in a good channel condition at a higher bit rate depending on the channel status information.

It is further another object of the present invention to provide a data processing method for packet data communication, wherein a mobile station transmits channel status information to a base station, and receives data with rate indicator that the base station has transmitted in response to the channel status information, so as to rapidly adapts to a variable bit rate.

It is still further another object of the present invention to provide a data processing method for packet data communication in a mobile communication system, wherein a mobile station determines a bit rate and power depending on a weighting factor corresponding to the type of service data.

It is still further another object of the present invention to provide a data processing method for packet data communication in a mobile communication system, wherein to maximize throughput of packet data during a handoff, a base station controller transmits divided different data to base stations concerned in the handoff, and the base stations receive channel status information and transmit packet data to a mobile station only when a channel is in a good condition.

It is still further another object of the present invention to provide a data processing method for packet data communication in a mobile communication system, wherein to maximize throughput of packet data during a handoff, a base station controller transmits the same data to base stations concerned in the handoff and the base stations receive channel status information and transmit packet data to a mobile station only when a channel is in a good condition.

In order to accomplish the above objects, there is provided a packet data processing device for a mobile communication system. A base station includes a channel status information receiver for receiving channel status information for a forward channel from a mobile station; a supplemental channel transmission controller for determining a bit rate of the mobile station according to the channel status information, a supplemental channel transmitter for transmitting data to the mobile station at the bit rate determined by the supplemental channel transmission controller; and a rate indicator transmitter for generating a rate indicator having information about the determined bit rate and transmitting the generated rate indicator to the mobile station. The mobile station includes a channel status measurer for detecting power of a signal received over a pilot channel to measure channel status; a channel status information transmitter for generating channel status information according to the measured channel status and transmitting the channel status information to a base station; and a supplemental channel receiver for detecting a bit rate of data transmitted at a variable rate from the base station and receiving data at the detected bit rate.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail. A preferred embodiment of the present invention may generally be defined as follows.

To maximize throughput of packet data, a mobile station receives a signal transmitted from a base station to detect a condition of a channel to the base station, and transmits corresponding channel status information to the base station. Upon receipt of the channel status information from multiple mobile stations, the base station transmits packet data to the mobile stations at different bit rates according to the conditions of the respective channels to the mobile stations. A detailed description will be given with reference to FIG. 2.

Figure 2:
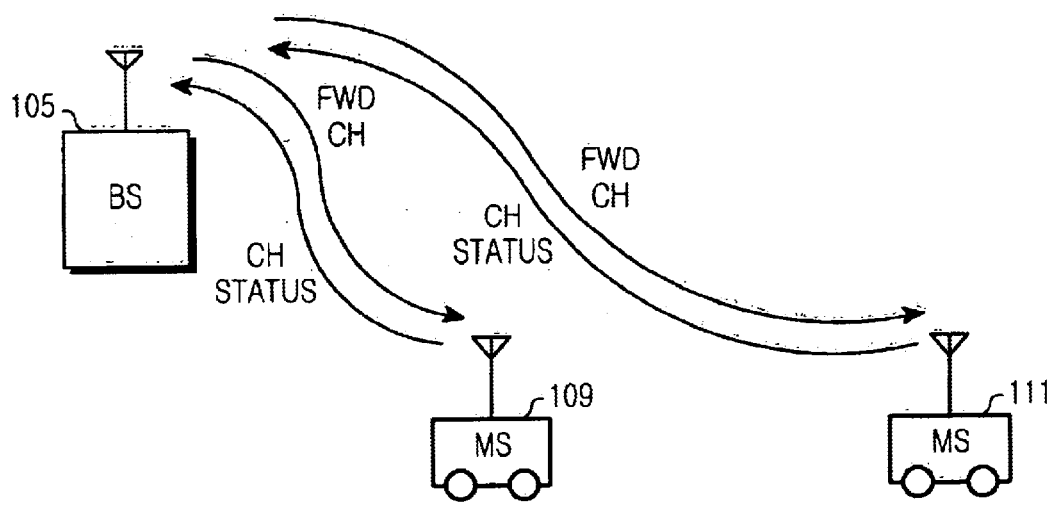
FIG. 2 is a diagram illustrating a procedure in which a base station sends packet data to mobile stations based on channel status information received from the mobile stations according to an embodiment of the present invention.

Referring to FIG. 2, a mobile communication system is comprised of a plurality of mobile stations 109–111, each in communication with a base station 105 whereby the base station 105 sends packet data to the mobile stations 109–111 based on channel status information received from the mobile stations according to an embodiment of the present invention.

FIG. 2 illustrates a state where mobile stations report forward channel conditions (i.e., CH STATUS) to a base station during a packet service. The forward channel can be a pilot channel or a traffic channel. The pilot channel is a common channel over which the base station transmits a pilot signal to the mobile station, and enables the mobile station to perform continuous channel status monitoring. The mobile station measures the power of the pilot channel or the traffic channel to generate channel status information.

The channel status information can vary according to a target channel for measurement, a channel measurement method, a coding method for a measured value and the number of information bits. Further, the method for transmitting the channel status information from a mobile station to a base station can also be varied. Herein, a reference will be made to several embodiments therefor.

For example, the channel status information can be a channel status information bit generated by detecting the power of a pilot channel or its power variation. A method for generating the channel status information bit will be later described in detail.

As another example, the channel status information can be a power control bit. A mobile station can generate a power control bit by measuring the power of a traffic channel or a pilot channel. A described method of generating a power control bit based on measurement of the pilot power at a mobile station can be found in Korean patent application number 98-22219 filed by the applicant of the invention and incorporated in its entirety herein by reference. The mobile station can send the power control bit for channel status reporting over a reverse pilot channel.

For fast adaption to variations in the channel status (or condition), a 1.25 ms or 2.5 ms frame is used which is shorter in length than a 20 ms or 5 ms frame for the circuit service. In particular, for a supplemental channel sending packet data at a high rate, a 1.25 ms frame can be used. Further, with respect to transmitting information for the purpose of channel status reporting in lieu of sending one bit (or power control bit) of 800 Hz per 1.25 ms over a reverse channel, a method can be used for sending several bits representing multiple levels during 1.25 ms or equivalently sending individual bits at a higher rate. That is, apart from sending an existing 800 Hz power control bit over the reverse channel, channel status information may be transmitted over a reverse channel at a rate of 9.6 Kbsp, 4.8 Kbsp, 2.4 Kbsp or 1.2 Kbsp. The reverse channel for sending the channel status information can be a reverse dedicated control channel or a separate status report channel. The separate status report channel can be a separate Walsh code channel. For fast application of the channel status information, the channel status report channel is preferably transmitted without channel encoding. For example, in the case where multi-level bits are transmitted at 4.8 Kbsp, since 6 information bits can be transmitted per 1.25 ms, it is possible to make the channel status report with 64 levels, which is more accurate as compared with a case where existing 2 levels are used. Further, when individual bits representative of ≠1 are sent at 4.8 Kbsp, a value representing a channel status is updated by monitoring the channel status at every 0.208 ms which is shorter than 1.25 ms. In sending the channel status information at a high rate, various coding techniques can be applied so as to effectively use bits representative of channel status information.

With regard to generating channel status information, it is possible for the mobile station to use a method for representing the measured strength of a pilot signal on a forward channel as an accumulated value of N channel status information bits and a weighting factor applied in summing the past channel status information bits. That is, a difference T(i) between the power value of a pilot signal measured at present (i.e., at time T1) and a reference value, which is a channel status information bit (CBS) determined at the present time, can be represented by $$T(i) = \sum_{j=i-N}^{i-1} [e^{-a(i-j)} CSB(j)]$$ [Equation 1]

where CSB(j) represents a channel status information bit at time j, and "a" represents a constant which is larger than or equal to zero. Therefore, to generate a new channel status information bit CSB(i) at the present time T1, the new channel status information bit CSB(i) is determined as +1 or −1 such that the sum T(i−1) of N previous channel status information bits, including the new channel status information bit CSB(i) more closely approaches a measured value for a common pilot signal. Here, $e^{-a(i-j)}$ is a term expressing a weighting factor applied in summing the past channel status information bits; when "a" is larger zero, the more past bits are summed with the more attenuated weighting factors, and when "a" is zero, all the channel status information bits are summed with the same weighting factor. When a mobile station transmits the channel status information bits generated as stated above to a base station for channel status reporting, the base station accumulates the received channel status information bits in accordance with Equation 1 to determine the channel status. This channel status information indication method is advantageous in that even though one or more channel status information bits may be in error, the errors are not cumulative so that the channel status information bits are restored at to a normal state after passage of a given number of channel status information bits.

As another channel status information indication method, ADPCM (Adaptive Differential Pulse Code Modulation) can be used, which encodes a difference between a sample value adaptively estimated from previous samples and an actual sample value. Since this method is well known in the art, a detailed description will be avoided herein.

As an alternate channel status information indication method, DM (Delta Modulation) can also be used, which encodes a difference between a sample value estimated from previous samples and an actual sample value into one bit. Since this method is also well known in the art, a detailed description will be avoided herein.

For fast adaption to the channel status, 1.25 ms frame is used as stated above. However, it is possible to vary the frame length according to the selected bit rate. For example, for a relatively low bit rate (e.g., 9.6 Kbsp), a 20 ms frame can be used; for an intermediate bit rate (e.g., 38.4 Kbps), a 5 ms frame can be used; and for a relatively higher bit rate (e.g., 307.2 Kbps), a 1.25 ms frame can be used. Table 1 shows the number of bits per frame according to the bit rate and the frame length. In Table 1, bold letters in shaded blocks denote the number of bits per frame for the combinations of the rates and frame lengths which can be supported.

TABLE 1

| Rate [Kbps] | 20 ms | 5 ms | 1.25 ms |
| --- | --- | --- | --- |
| 9.6 | 192 | 48 | 12 |
| 19.2 | 384 | 96 | 24 |
| 38.4 | 768 | 192 | 48 |
| 76.8 | 1536 | 384 | 96 |
| 153.6 | 3072 | 768 | 192 |
| 307.2 | 6144 | 1536 | 384 |

Prior to describing a handoff performed between two or more base stations, a description will be first made regarding operations of base stations with reference to FIG. 2. Since the respective base stations perform the same operation, the description will be made regarding only an operation of a base station 105, for simplicity.

To maximize throughput of packet data, during data transmission, the base station 105 receives channel status reports for corresponding forward channels from mobile stations 109 and 111 at every frame, as illustrated in FIG. 2. The base station 105 should determine the power allocation for each mobile station to which a radio link is formed, and a bit rate according to the channel condition estimated by the mobile station. A description will be now made regarding a method for determining power allocation and bit rates for the respective mobile stations. The method for determining the power allocation and the bit rate can be divided into three submethods as follows:

In a first method for determining power allocation and bit rate, upon receipt of a channel status report from a mobile station for a forward channel FWD_CH, the base station 105 concentratively allocates its transmission power to the mobile station from among the plurality of mobile stations in the best channel condition, i.e., a mobile station for which the base station can provide the highest bit rate with the lowest transmission power, during the next frame. For example, in FIG. 2, when the mobile station 109 is in a better channel condition than mobile station 111, the base station 105 concentrates its transmission power for the next frame on data which is transmitted to the mobile station 109 over the supplemental channel.

More specifically, upon receipt of channel status reports from the mobile stations 109 and 111, the base station 105 calculates a power value required to transmit data to the respective mobile stations 109 and 111 at a 1 Kbps rate, the calculated power value is based on an accumulated value of power control bits transmitted from each mobile station reporting its respective channel status. Here, the total transmission power of the base station 105 is the sum of values obtained, for the mobile stations 109 and 111, by multiplying bit rates for the mobile stations 109 and 111 by power values for sending data to the mobile stations 109 and 111 at 1 Kbps. On this condition, the base station 105 allocates the power so as to maximize the sum of bit rates for the mobile stations 109 and 111. By doing so, it is possible to allocate the entire power to the mobile station 109 which is in the best channel condition, i.e., the mobile station 109 to which the base station 105 can send data with the lowest power at 1 Kbps. This power allocation is newly performed at every frame. In algebraic expression, when the total transmission power of a base station is $P_T=P_1+P_2+\ldots+P_N$ (where $P_1, P_2, \ldots,$ and $P_N$ denote power of mobile stations $1, 2, \ldots,$ and N, respectively), an aim is to calculate a vector $P=\{P_1, P_2, \ldots, P_N\}$ which maximizes the sum, $BR(1)+BR(2)+\ldots+BR(N)$, of bit rates for the respective mobile stations. Power (or Eb/No), $P_b^R(i)$, required to send data at 1 Kbps is a value known to the base station for the respective links. From the standpoint of the base station, maximization of the throughput can defined as $$\text{Given} \sum_{i=1}^{N} BR(i)P_b^R(i) = P_T \quad \text{[Equation 2]}$$

$$\text{Maximize}\left(\sum_{i=1}^{N} BR(i)\right)$$

For a general solution of Equation 2, $P_k=P_T$ for i and k which minimize the value $P_b^R(i)$, and $P_{i(\neq k)}=0$ for the remaining i. If a bit rate $BR(k)$ satisfying a given condition $BR(k) \cdot P_b^R(k)=P_T$ exceeds a maximum permissible bit rate $BR_{max}$, power $P_k$ for a mobile station having the minimum $P_b^R(i)$ is set to $BR_{max} \cdot P_b^R(k)$. That is, a bit rate is set to $BR_{max}$ and the remaining power $(P_T-P_k)$ is allocated to a mobile station whose $P_b^R(i)$ has a next low value.

Power allocation of a base station depending on the channel condition increases a bit rate for the mobile station 109 in the good channel condition, but decreases a bit rate for the mobile station 111 in the bad channel condition.

In a second method proposed to solve this problem, a base station allocates its power such that a bit rate dependent on the channel condition, multiplied by a weighting factor w(i) dependent on a quality of service (QoS) of the mobile station is maximized. The weighting factor is determined according to the QoS required by the respective mobile stations. This can be optimized in accordance with the following equation:

$$\text{Given} \sum_{i=1}^{N} BR(i)P_b^R(i) = P_T \quad \text{[Equation 3]}$$

$$\text{Maximize}\left(\sum_{i=1}^{N} w(i)BR(i)\right)$$

The base station allocates the power according to this maximization formula and then, transmits data with power allocated for a mobile station i at a possible bit rate $BR(i)=Pi/P_b^R(i)$.

In a third method, the base station 105 allocates a fixed power to the respective mobile stations, and then variably sets the bit rate according to the channel condition which is monitored in real time. Upon receipt of a channel status report for the forward channel FWD_CH, the base station 105 transmits data to a mobile station in a good channel condition at a higher bit rate and to a mobile station in a bad channel condition at a lower bit rate over the supplemental channel for the next frame. For example, in FIG. 2, if the mobile station 109 has a good channel condition, the base station 105 transmits data to the mobile station 109 at a higher bit rate and transmits data to the mobile station 111 having a relative bad channel condition at a lower bit rate.

More specifically, in the third power allocation and bit rate determination method, the base station allocates the same fixed power level to the respective mobile stations. Upon receipt of channel status reports from the mobile stations 109 and 111, the base station 105 calculate bit rates for the respective mobile stations 109 and 111 based on the channel status reports. For example, the bit rate can be determined based on an accumulated value of power control bits transmitted from a channel status reporting mobile station and the fixed power allocated to the mobile station. More specifically, the bit rate is determined to be directly proportional to the allocated fixed power and inversely proportional to the accumulated value of the power control bits. Here, the accumulated value of the power control bits is updated at every frame according to the channel condition, and the bit rate is also updated at every frame according to the channel condition.

When adaptively determining the bit rate to be transmitted at each frame, the base station uses the fixed power allocated to a target mobile station and the channel status information received from the target mobile station in the previous frame. The channel status information may be, for example, the strength of a common pilot signal. The variable bit rate, defined as a par bit rate, can be expressed as:

Par Bit Rate=K·(power)·(strength of a common pilot signal) [Equation ]

where K is a constant and the strength of a common pilot signal is inversely proportional to the accumulated value of the power control bits.

As described above, when a base station transmits data to a mobile station with allocated power for one frame, a bit rate is adaptively determined according to the channel condition.

When the bit rate is adaptively determined as stated above, a mobile station should detect the variable bit rate to receive data. For detecting the variable bit rate, a mobile station can use the following two methods.

In a first method, a mobile station can perform blind detection to receive data of variable rate. For blind detection, the mobile station performs data detection for all the possible bit rates and then selects data at a CRC (Cyclic Redundancy Code)-verified rate.

Figure 19A:
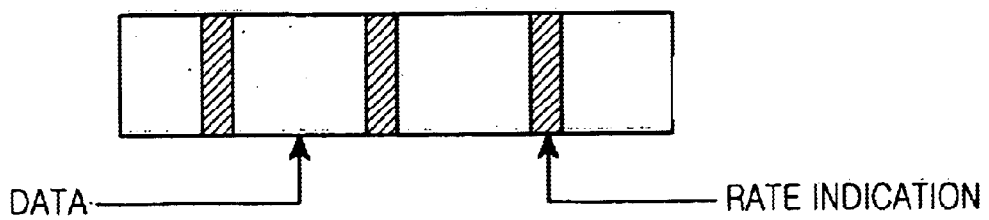
FIG. 19A is a diagram illustrating a method for inserting a rate indicator in a supplemental channel for transmitting user data according to an embodiment of the present invention.

In a second method, a base station sends bit rate information to a mobile station over a forward channel. The base station can transmit a rate indicator over a supplemental channel for transmitting user data, as illustrated in FIG. 19A. The rate indicator can include several rate indication bits inserted in the data frame at predetermined locations. Here, the rate indication bits can be transmitted at fixed periods (or at a fixed rate), and can also be dispersedly located within the frame to obtain a time-switched diversity effect. More specifically, the base station inserts the rate indication bits in frame data being transmitted over a supplemental channel to transmit the rate indication bits. To insert the rate indicator at every frame, there are required means for generating the rate indicator and means for inserting the rate indicator.

For example, the means for generating the rate indicator can generate the rate indicator in the following method.

The base station may include corresponding Walsh code information with the rate indicator being transmitted to the mobile station. The Walsh code is used for separating forward channels; a primitive Walsh code of the shortest length is used at the highest bit rate. At a bit rate lower by 1/N than the highest bit rate, the primitive Walsh code or an inverse primitive Walsh code, which is repeated by N times according to a specific pattern, is used. Therefore, the base station can previously assign the primitive Walsh code to the mobile station at the beginning of the service, and send repetitive pattern information of the primitive Walsh code together with the rate indicator in every frame. The mobile station then combines primitive symbol values obtained by multiplying the primitive Walsh code by a received signal, according to the repetitive pattern, to determine symbol values matched to the rate. For example, a mobile station assigned with a primitive Walsh code "+1+1−1−1" sequentially multiplies "+1+1−1−1" by a recerved 4-chip signal and integrates the multiplied signal to obtain a primitive symbol S1. The mobile station again sequentially multiplies "+1+1−1−1" by the next received 4-chip signal and integrates the multiplied signal to obtain a primitive symbol S2. Further, the mobile station detects rate information and analyzes the detected rate information. As the result of the analysis, if the rate is ½ the highest rate and the repetitive pattern is "+1+1", the mobile station determines a symbol value for the corresponding rate as S1+S2. In addition, when the repetitive pattern is "+1−1", the mobile station determines a symbol value for the corresponding rate as S1−S2. In another Walsh code assignment method, a base station can assign the longest Walsh code corresponding to the lowest rate to respective mobile stations at the beginning of the service, and designate one of the mobile stations using a lower Walsh code made by a combination of upper Walsh codes to use the upper Walsh code, which is an element of the longest Walsh code, at a rate higher than the lowest rate. Here, the mobile station can uniquely detect a corresponding Walsh code from the rate information.

When using several frame lengths, a base station can notify a frame length to be used to a mobile station through a dedicated control channel message. When the frame length is uniquely determined according to the rate, it is possible to distinguish the frame length depending on only the rate indicator without separate frame length indication.

In addition, a multiplexer can be used for the means for inserting the rate indicator in frame data on a supplemental channel.

Figure 20:
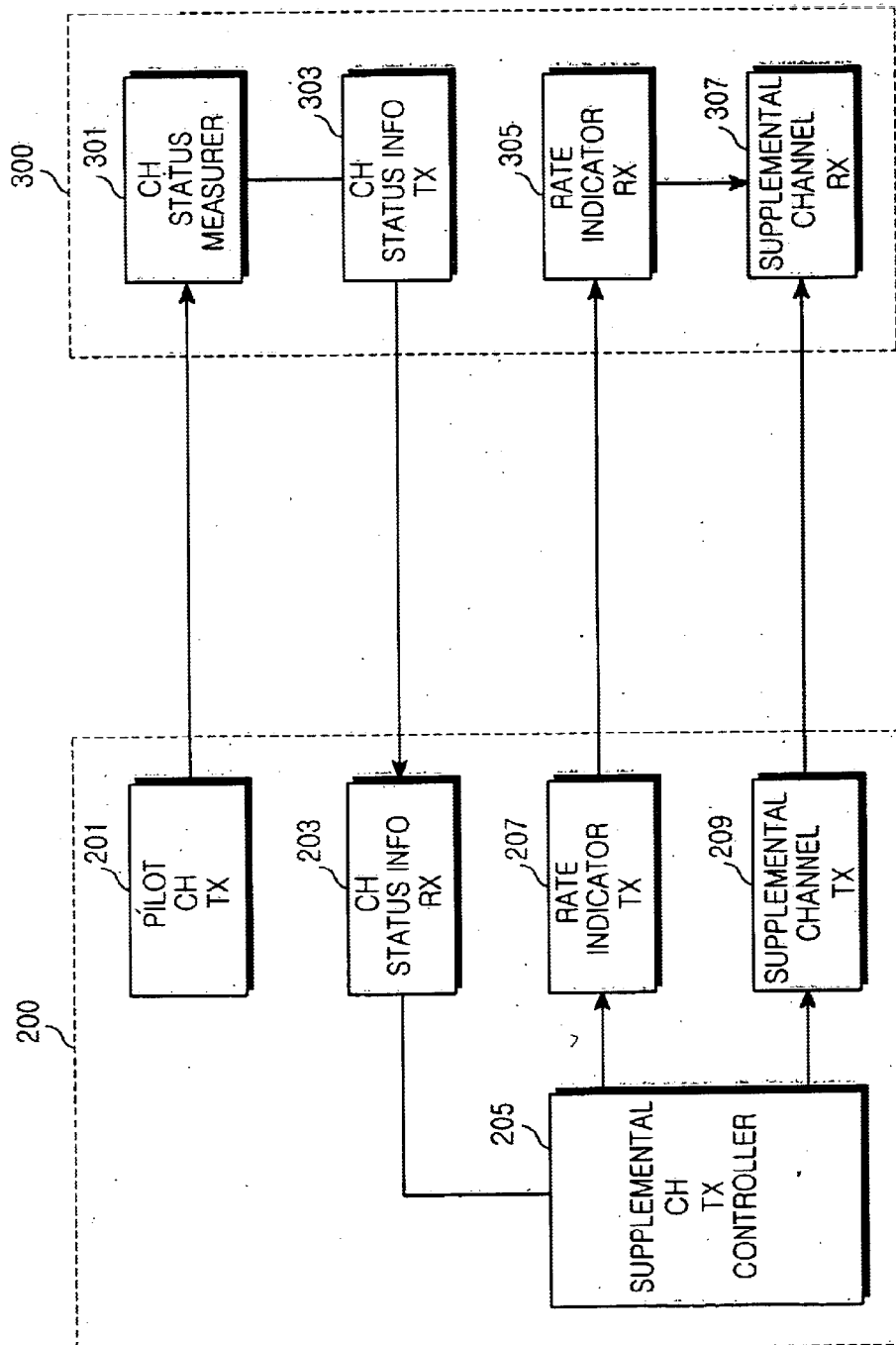
FIG. 20 is a diagram illustrating a base station and a mobile station, constructed to support effective forward packet transmission according to an embodiment of the present invention.

FIG. 20 illustrates a base station and a mobile station, constructed to perform effective forward packet data transmission according to an embodiment of the present invention.

Referring to FIG. 20, reference numeral 200 denotes a base station and reference numeral 300 denotes a mobile station. The base station 200 includes a supplemental channel transmission controller 205, a common pilot transmitter 201, a channel status information receiver 203, a rate indicator transmitter 207 and a supplemental channel transmitter 209. The common pilot transmitter 201 continuously transmits a common pilot signal over a forward pilot channel. The channel status information receiver 203 receives a channel status report that a mobile station has transmitted in response to the common pilot signal, and provides the channel status information to the supplemental channel transmission controller 205. Upon receipt of the channel status information from the channel status information receiver 203, the supplemental channel transmission controller 205 determines power, frame length and bit rate of data to be transmitted to the mobile station 300 which has made the channel status report. The supplemental channel transmission controller 205 enables the supplemental channel transmitter 209 to transmit data using the determined power, frame length and bit rate. The supplemental channel transmitter 209 transmits data under the control of the supplemental channel transmission controller 205. The base station may transmit a rate indicator together with the transmission data by inserting the rate indicator in the data as shown in FIG. 19A. In addition, the base station 200 may include a rate indicator transmitter 207 for transmitting the rate indicator over a separate channel. The rate indicator transmitter 207, under the control of the supplemental channel transmission controller 205, generates a rate indicator and transmits the generated rate indicator over a channel which is spread with a separate Walsh code. The rate indicator may include information about bit rate, Walsh code number and Walsh code length.

The mobile station 300 includes a channel status measurer 301, a channel status information transmitter 303, rate indicator receiver 305 and a supplemental channel receiver 307. The channel status measurer 301 receiving a pilot signal over a forward common pilot channel, measures the strength of the received pilot signal to provide channel status information to the channel status information transmitter 303. The channel status information transmitter 303 transmits to the base station 200 the channel status information provided from the channel status measurer 301. The supplemental channel receiver 307 detects a frame length and a bit rate from a received signal, and receives data using the detected frame length and bit rate.

Figure 21:
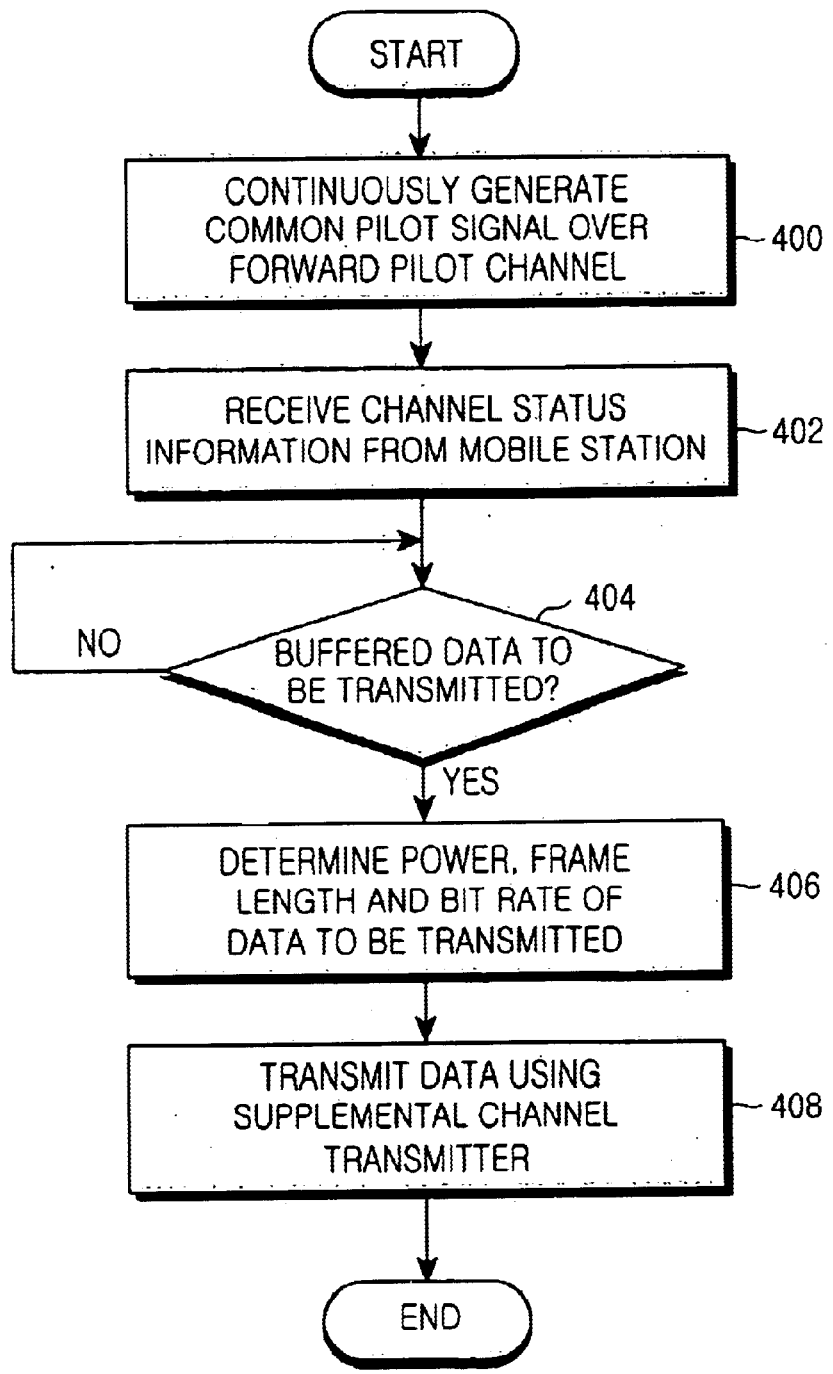
FIG. 21 is a flow chart illustrating an operation of a base station, for inserting a rate indicator in data according to an embodiment of the present invention.

FIG. 21 illustrates a procedure in which a base station inserts a rate indicator in data for transmission according to an embodiment of the present invention.

Referring to FIG. 21, a base station generates a common pilot signal using the common pilot transmitter 201 and continuously transmits the generated common pilot signal over a forward pilot channel, in step 400. The base station receives channel status information transmitted from the mobile station in response to the common pilot signal, using the channel status information receiver 203 in step 402. Upon receipt of the channel status information from the mobile station, the base station examines in step 404, a channel card buffer 113 of FIG. 3 to determine whether there is any buffered data to be transmitted to the mobile station. In step 406, when there is data to transmit to the mobile station, the base station determines the power, frame length and bit rate of the data according to the channel status information received in step 402. Upon determination of the power, frame length, and bit rate, the base station transmits the data using the supplemental channel transmitter 209, in step 408. Here, the base station can optimally insert a rate indicator in the data to transmit the rate indicator.

Figure 22:
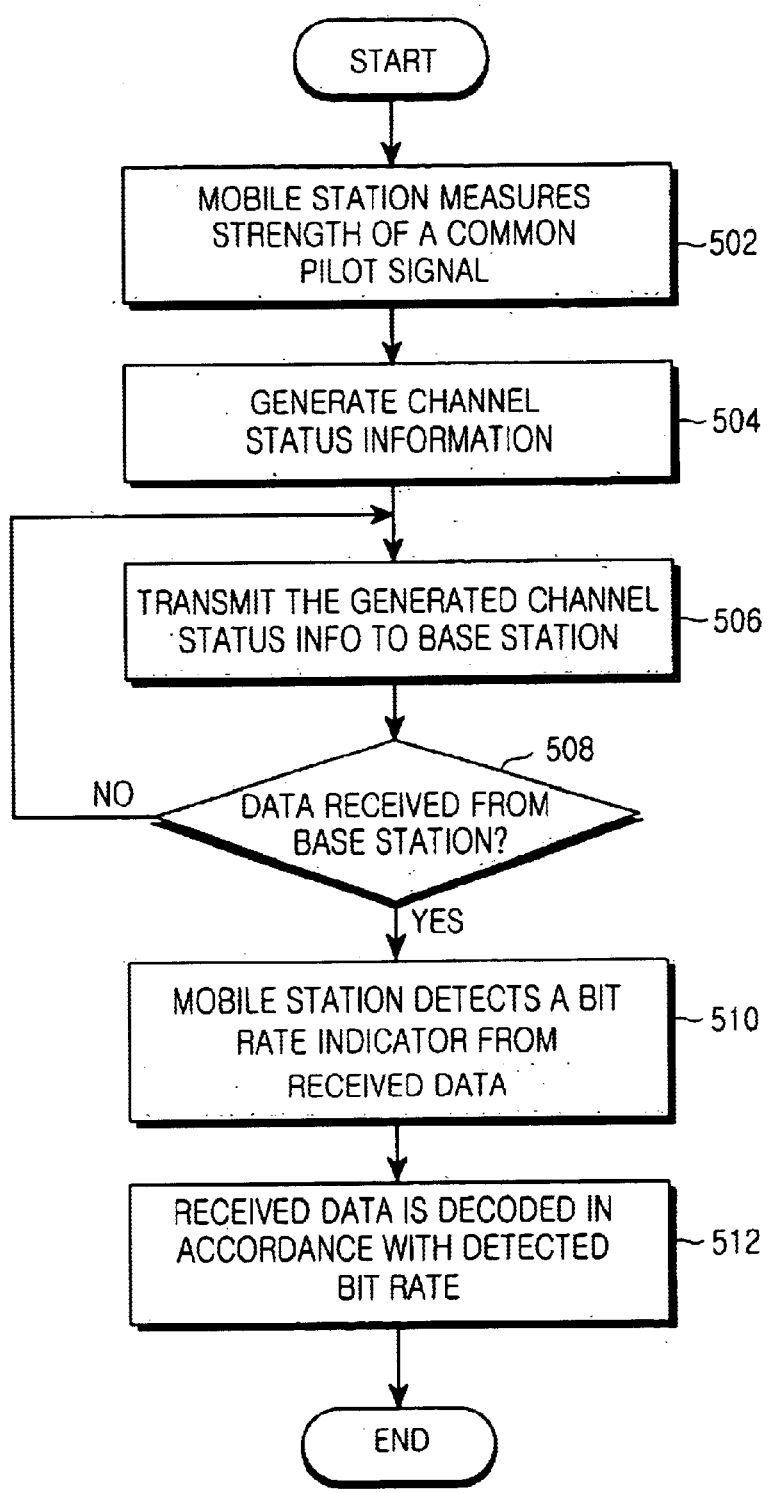
FIG. 22 is a flow chart illustrating an operation of a mobile station according to an embodiment of the present invention.

FIG. 22 is a flowchart illustrating the operation of a mobile station according to an embodiment of the present invention. Referring to FIG. 22, a mobile station measures the strength of a common pilot signal received over a common pilot channel using the channel status measurer 301 in step 502. After measuring the strength of the common pilot signal, the mobile station controls the channel status measurer 301 to generate channel status information in step 504. The generated channel status information is transmitted to the base station by the channel status information transmitter 303 in the mobile station, in step 506. After transmission of the channel status information, the mobile station monitors a supplemental channel in step 508 to determine whether data is received from the base station. When data is received over the supplemental channel, the mobile station detects a bit rate indicator from the received data in step 510 and then performs demodulation and decoding for the received data in accordance with the detected bit rate in step 512.

Figure 19B:
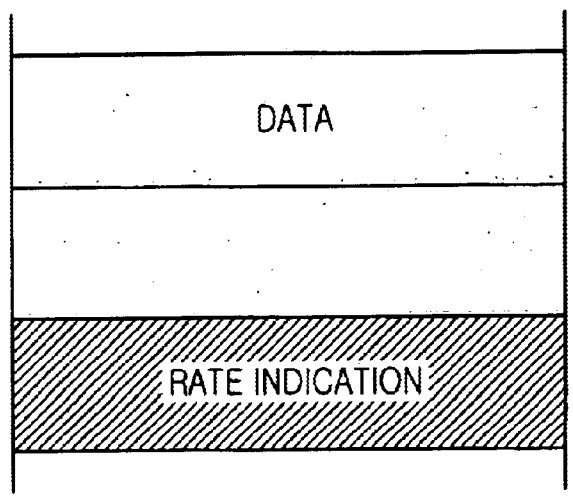
FIG. 19B is a diagram illustrating a method for inserting a rate indicator in a separate channel according to an embodiment of the present invention.

As another method, the base station can transmit a rate indicator over a separate channel as illustrated in FIG. 19B. In this case, the base station should include a rate indicator transmitter 207 for transmitting a bit rate indicator over the separate channel to the mobile station under the control of the supplemental channel transmission controller 205. The separate channel can be a rate indication channel using a separate code.

Further, the mobile station should include a rate indicator receiver 305 which receives the rate indicator from the rate indicator transmitter 207 in the base station over the separate channel and detects power, frame length and bit rate of data to be received by analyzing the rate indicator. The rate indicator receiver 305 provides information about the detected power, frame length and bit rate to the supplemental channel receiver 307. The supplemental channel receiver 307 then receives the data according to the frame length and bit rate, and performs demodulation and decoding for the received data.

Figure 23:
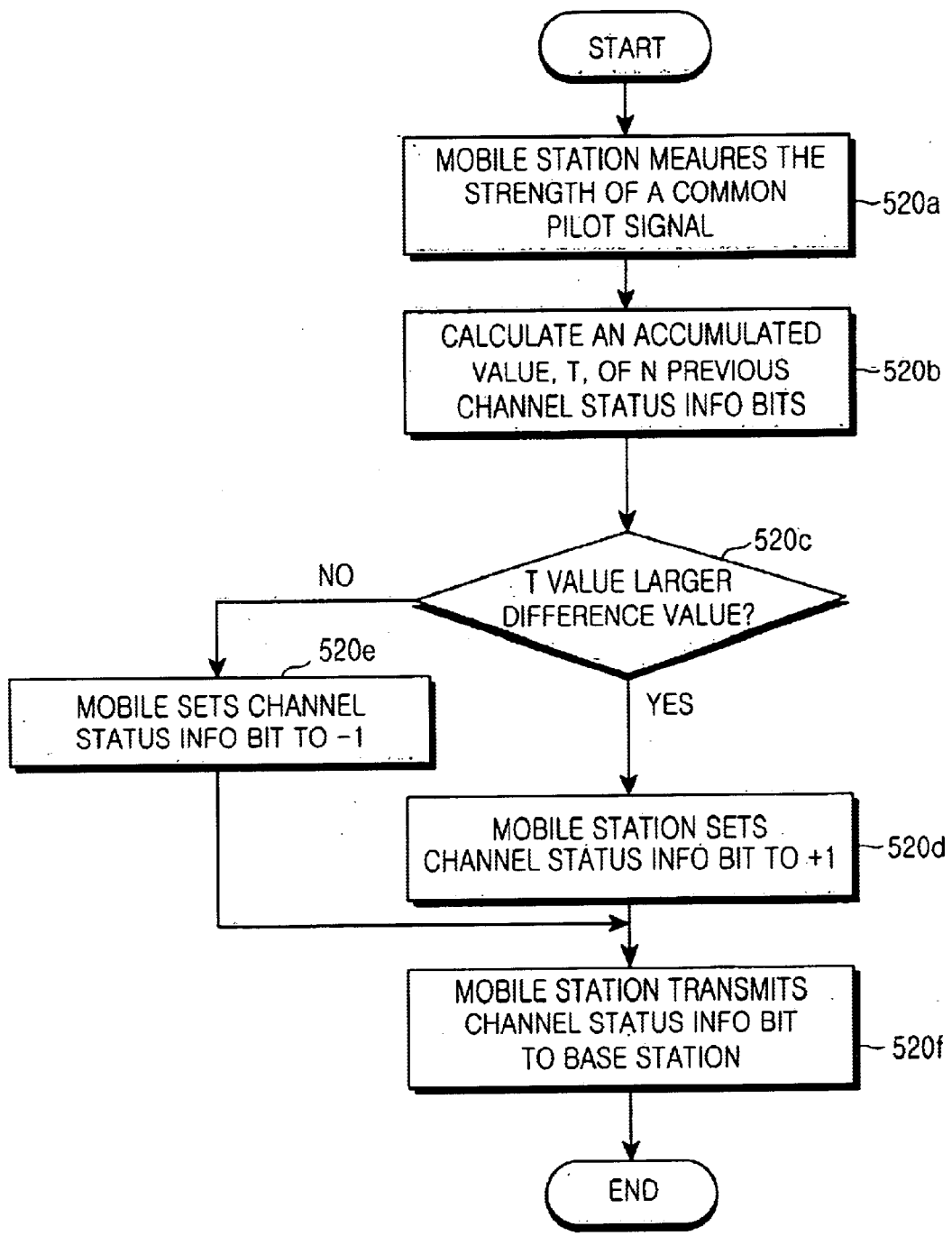
FIG. 23 is a flow chart illustrating a channel status reporting procedure of a mobile station according to an embodiment of the present invention.

FIG. 23 illustrates a channel status reporting procedure of a mobile station. Herein, a description will be made regarding an embodiment where the channel status information is represented by a channel status information bit. A mobile station receives a common pilot signal to measure the strength of the received common pilot channel signal, in step 520a. Thereafter, the mobile station calculates an accumulated value, T, of N previous channel status information bits in accordance with Equatiion 1, in step 520b. Subsequently, the mobile station compares the calculated value T with a difference value obtained by subtracting a reference value from the measured value of the common pilot signal, in step 520c. When the difference value is larger than the value T, the mobile station sets the channel status information bit to +1 in step 520d. Otherwise, when the difference value is not larger than the value T, the mobile station sets the channel status information bit to −1 in step 520e. Thereafter, the mobile station transmits the channel status information bit to the base station in step 520f.

Figure 24:
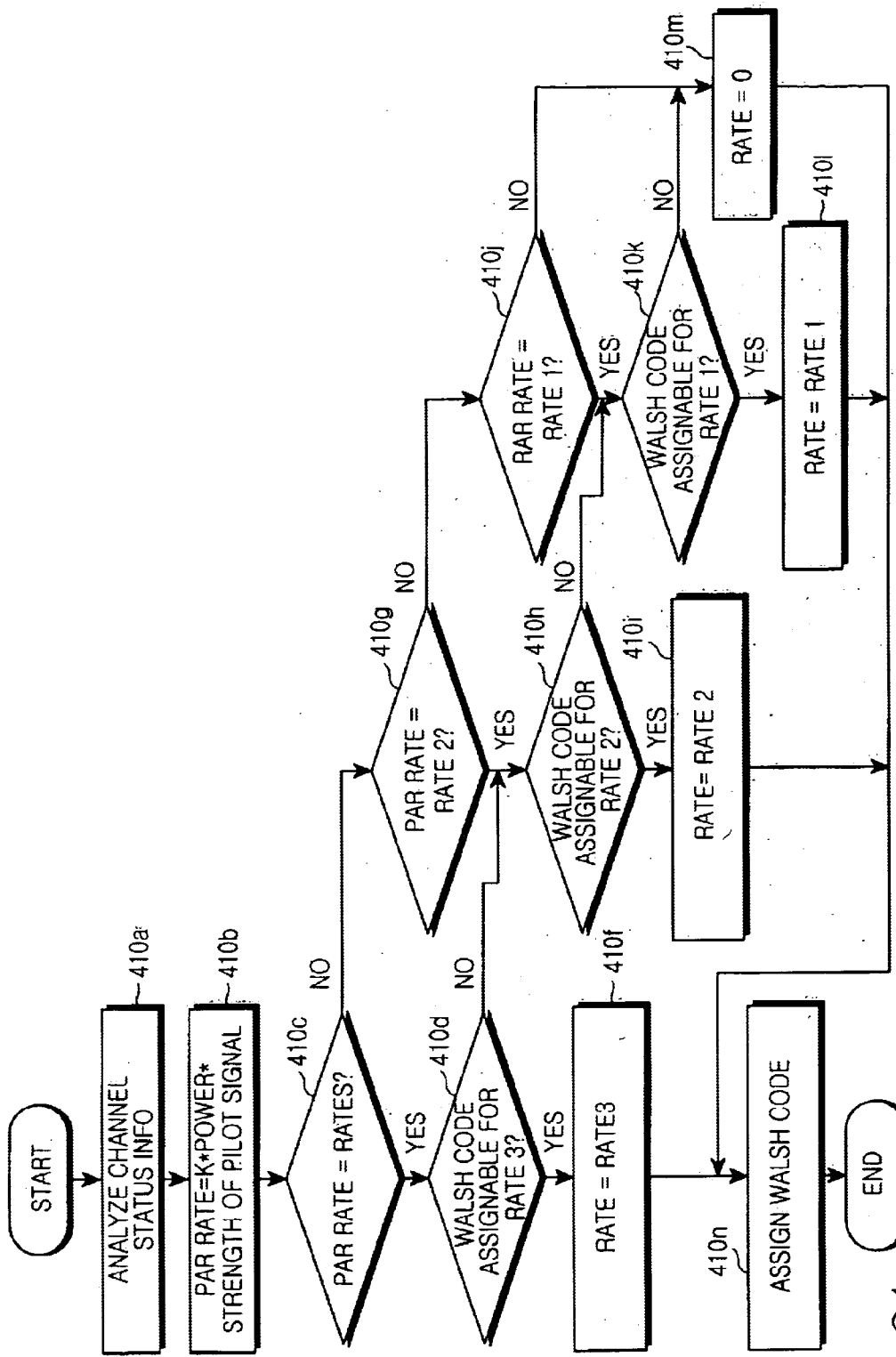
FIG. 24 is a flow chart illustrating a rate determining procedure of a base station according to an embodiment of the present invention.

FIG. 24 illustrates a rate determining procedure of a base station. In FIG. 24, it is assumed that there exist three rates RATE1, RATE2 and RATE3, where RATE3>RATE2>RATE1. In practice, however, additional rates are within the scope of the invention. In addition, it is assumed that the channel status information is represented by a channel status information bit.

Referring to FIG. 24, the base station accumulates N previous channel status information bits received from a mobile station to derive information about the strength of a common pilot signal, in step 410a. After deriving the channel status information, the base station determines a rate using the channel status information, in step 410b. To determine a rate, the base station first calculates a par rate which is proportional to transmission power and the strength of the common pilot signal. That is, the par rate=K* (transmission power)*(strength of a common pilot signal), where K is a proportionality constant. Thereafter, it is determined, in step 401c, whether the calculated par rate is higher than or equal to the highest rate RATE3. When the par rate is not higher than or equal to the highest rate RATE3, it is determined in step 410g whether the par rate is higher than or equal to the second highest rate RATE2. When the par rate is not higher than or equal to the second highest rate RATE2, it is determined in step 410j whether the par rate is higher than or equal to the third highest rate RATE1. Further, when the par rate is not higher than or equal to the third highest rate RATE1, the bit rate is set to "0" in step 401m, which means non-transmission of data.

Otherwise, when the par rate is higher than or equal to one of the prescribed rates (i.e., RATE1, RATE2, RATE3), the procedure continues to one of steps 410d, 410h and 410k. In steps 410d, 410h and 410k, it is determined whether a Walsh code can be assigned for the corresponding rate. When a Walsh code can be assigned for the corresponding rate, the corresponding rate is determined as a permissible rate, in step 410f, 410j or 410l. However, when the Walsh code cannot be assigned for the corresponding rate, it is determined whether a Walsh code can be assigned for a rate lower than the above-stated rate. When the Walsh code is assigned for a lower rate, the rate is defined as a permissible rate. After determining the permissible rate, the base station assigns the Walsh code in step 410n.

Figure 3:
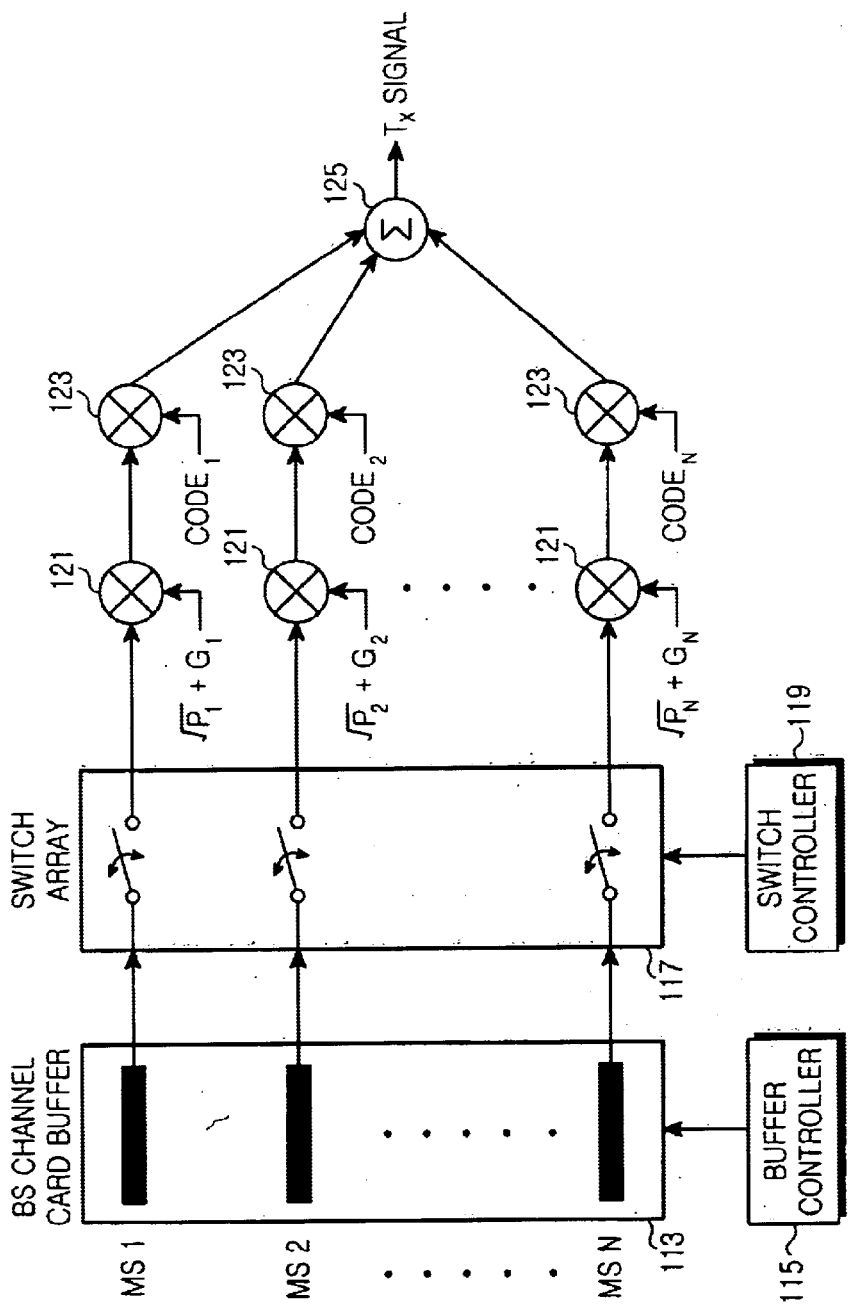
FIG. 3 is a diagram illustrating a channel card for a base station according to an embodiment of the present invention.

FIG. 3 illustrates a channel card in a base station, for assigning a bit rate and transmission power. Referring to FIG. 3, a base station channel card buffer 113 stores data to be transmitted to respective mobile stations in service. In FIG. 3, the base station channel card services N mobile stations. A buffer controller 115 controls data read/write operations of the card buffer 113 according to a command from an upper layer. A detailed description of the buffer control operation will be provided later. A switch array 117 includes N switches corresponding to respective mobile stations MS1-MSN. A switch controller 119 controls the ON/OFF operations of the switches constituting the switch array 117 to output data to only a specific mobile station for a specific duration. The switch array 117 also serves to shut off the output when data transmission is impossible due to a bad channel condition. Gain multipliers 121 multiply data corresponding to the respective mobile station, output from the switch array 117, by gains $P_i^{1/2}+G_i$ (i=1, 2, . . . ,N). $P_i^{1/2}$ multiplied by a unit power signal is a gain value for multiplying output power for respective mobile station by $P_i$. The power $P_i$ allocated for transmission to each mobile station (i=1, 2, . . . ,N) can be variable or fixed. In addition, the base station can perform power control so as to more finely adapt the transmission power assigned to a mobile station to a particular channel. $G_i$ is a gain value for power control and is either zero or negative. Since the allocated power has the maximum value, $G_i$ should be smaller than zero in order to reduce the maximum power value.

Therefore, an i-th gain corresponding to an ith mobile station is in the range between 0 and $P_i^{1/2}$. In particular, when the frame is short in length and $P_i$ is updated at every frame, it is preferable not to perform power control, i.e., it is preferable to set $G_i$ to zero and the gain to $P_i^{1/2}$. The gain-multiplied signals output from the gain multipliers 121 are applied to spreaders 123, which multiply the gain-multiplied signal by different spreading codes for CDMA (Code Division Multiple Access) transmission, and provide output signals to a summer 125. The summer 125 sums the signals output from the spreaders 123 to output a transmission signal.

Heretofore, a description has been made regarding embodiments where a base station receives a channel status report from a mobile station, and determines power and bit rate of packet data to be transmitted to the mobile station according to the channel status report. A description will be provided directed to a packet data processing operation which occurs during a handoff.

Figure 1:
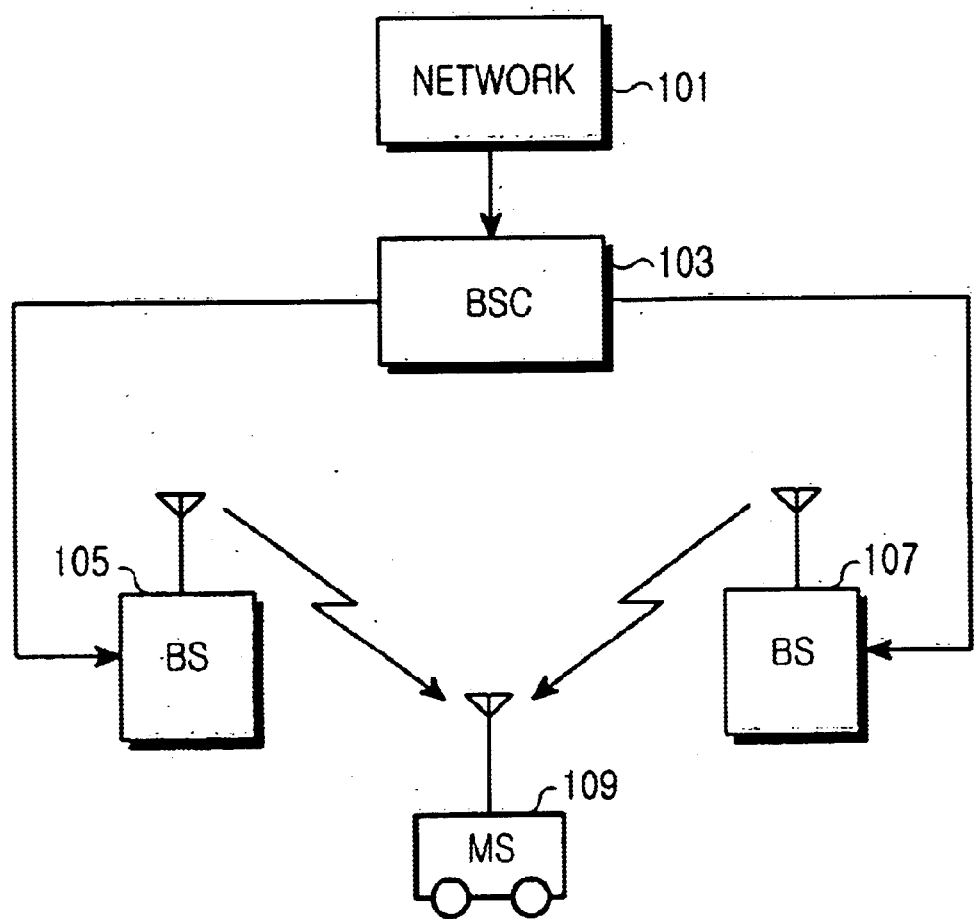
FIG. 1 is a diagram illustrating a mobile communication system to which a handoff method is applied according to an embodiment of the present invention.

FIG. 1 illustrates a mobile communication system to which the present invention is applied. Referring to FIG. 1, when a mobile station 109 is located at a boundary between service areas of base stations 105 and 107, the mobile station 109 simultaneously communicates with the mobile stations 105 and 107 when performing a soft handoff. To perform the handoff, the mobile communication system includes a network 101, a base station controller (BSC) 103, the base stations 105 and 107 connected to the base station controller 103, and the mobile station 109. When it is required to transmit data to the mobile station 109, the network 101 transmits the data to the base station controller 103. The base station controller 103 then transmits the data received from the network 101 to the base stations which can service the mobile station 109. Here, the number of the base stations can be more than one. FIG. 1 shows a case where there are two base stations 105 and 107 which can service the mobile station 109. The base stations 105 and 107 transmit the data received from the base station controller 103 to the mobile station 109 over the corresponding radio channels.

Now, a detailed description will be made regarding a method for performing a handoff when a mobile station is provided with services from more than two base stations.

A handoff method according to an embodiment of the present invention can be divided into two stages, a first stage for dividing data to be transmitted into two different data streams in order to transmit the different data streams simultaneously to two base stations, and a second stage for transmitting the same data to the two base stations.

Figure 4:
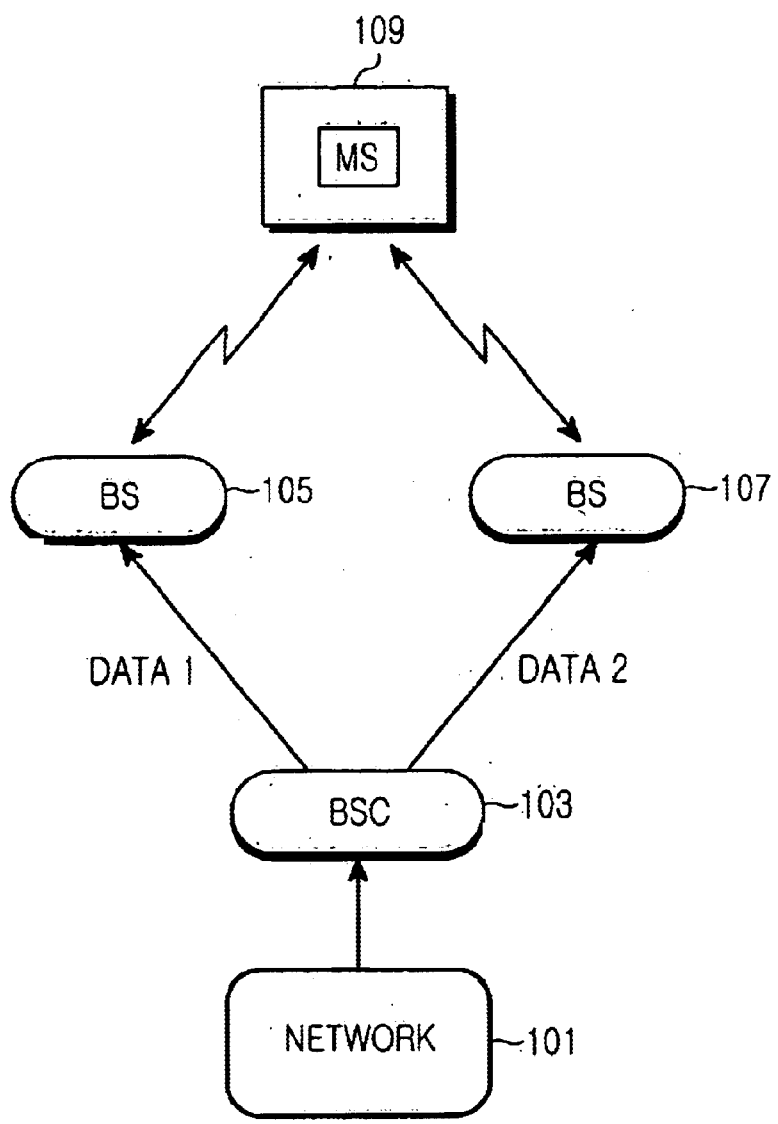
FIG. 4 is a diagram illustrating a handoff method in which divided different data are transmitted to two base stations according to a first embodiment of the present invention.

In accordance with the first stage (i.e., data division), upon receipt of data to be transmitted to a mobile station 109 from a network 101, a base station controller 103 divides the original data into different data streams DATA1 and DATA2 and transmits the first data stream DATA1 to a base station 105 and the second data stream DATA2 to a base station 107, as illustrated in FIG. 4. The base stations 105 and 107 then transmit the received first and second data streams DATA1 and DATA2 to the mobile station 109, respectively. The mobile station 109 recombines the first and second data streams DATA1 and DATA2 received from the respective base stations 105 and 107 to restore the original data stream transmitted from the network 101.

Figure 5:
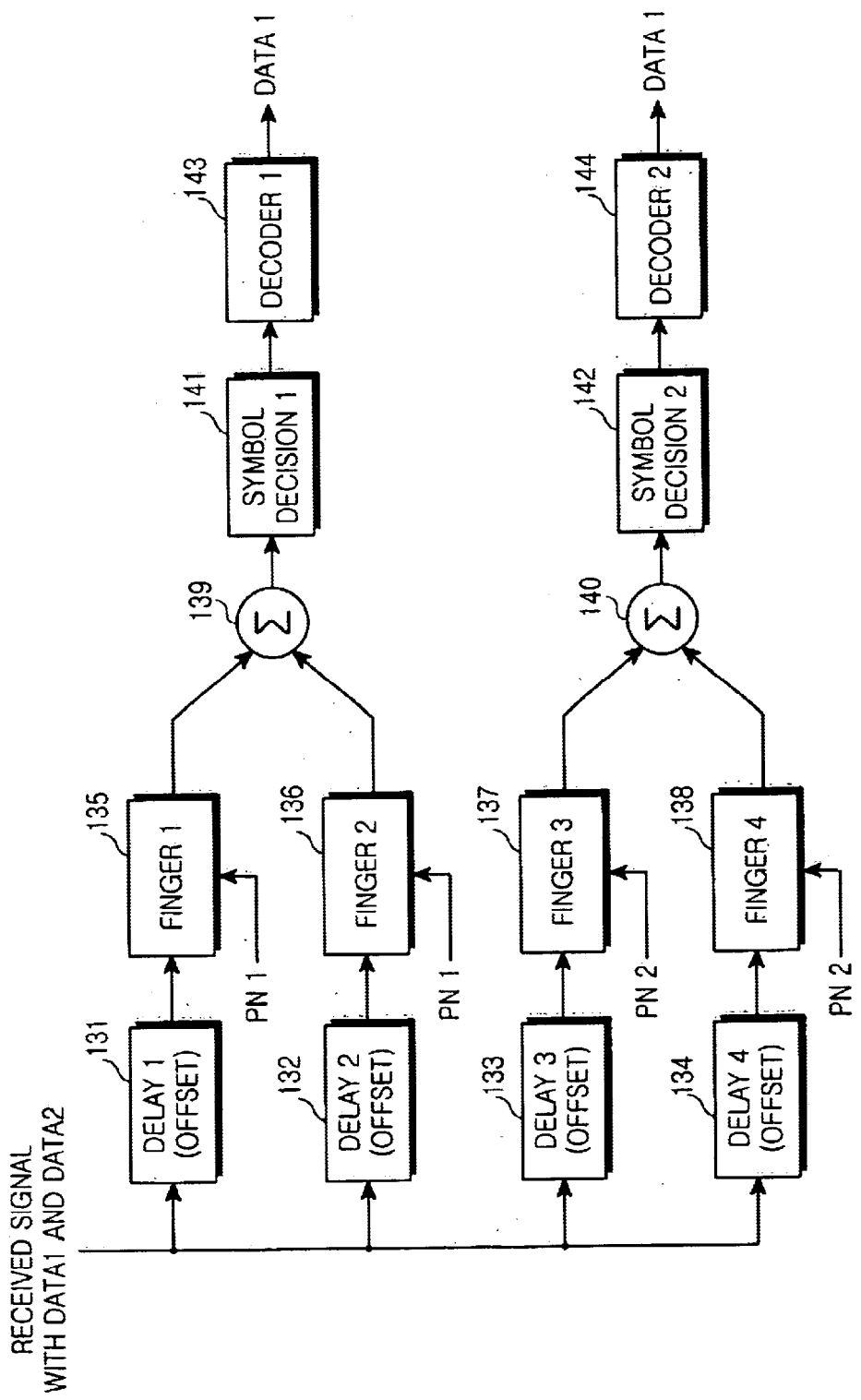
FIG. 5 is a diagram illustrating a finger configuration for a mobile station, for receiving divided different data according to an embodiment of the present invention.

FIG. 5 illustrates a receiver of a mobile station, for receiving the data streams (DATA1 and DATA2) stated above. Referring to FIG. 5, a mobile station includes a plurality of fingers to simultaneously receive signals transmitted from more than two base stations. Since the structure of the finger is well known in the art, a detailed description will be avoided herein.

Referring to FIG. 5, the receiver receives the first data DATA1 transmitted from the base station 105 at a first finger 135 and a second finger 136 via a first delay 131 and a second delay 132, delay times of which are set by corresponding searchers (not shown). The first and second fingers 135 and 136 are provided with a unique despreading code PN1 to despread the first data DATA1. Further, the receiver receives the second data DATA2 transmitted from the base station 107 at a third finger 137 and a fourth finger 138 via a third delay 133 and a fourth delay 134, delay times of which are set by corresponding searchers. The third and fourth fingers 137 and 138 are provided with a unique despreading code PN2 to despread the second data DATA2. The despread data DATA1 output from the first and second fingers 135 and 136 are summed by a summer 139 and restored to the original data DATA1 through a first symbol determiner 141 and a first decoder 143. Further, the despread data DATA2 output from the third and fourth fingers 137 and 138 are summed by a summer 140 and restored to the original data DATA2 through a second symbol determiner 142 and a second decoder 144.

During the handoff, the mobile station sends channel status information over a reverse channel to make a channel status report to the base station. For channel status reporting, the mobile station can use an asymmetric power control method in which a base station sends different channel status information to multiple base stations using multiple power control bits. Each power control group on a reverse channel includes individual power control bits for the respective base stations. The asymmetric power control is well disclosed in PCT/KR/98-00186 filed by the applicant of the invention.

Figure 6:
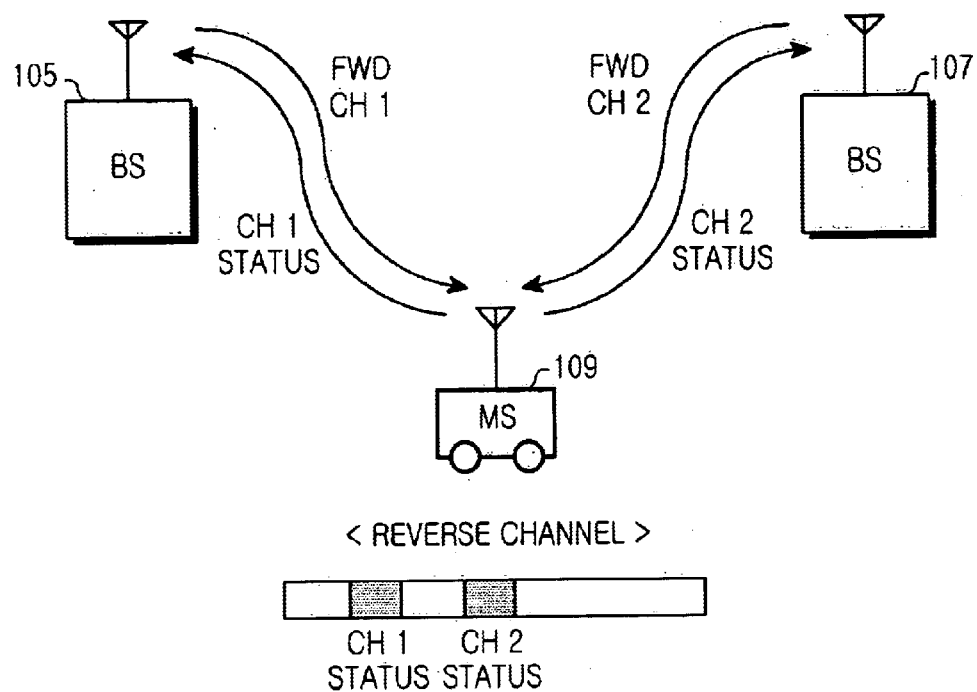
FIG. 6 is a diagram illustrating a channel status reporting procedure during a handoff according to an embodiment of the present invention.

FIG. 6 illustrates a channel status reporting method during a handoff. As shown, upon receipt of a signal over a first forward channel FWD_CH1 from a base station 105, a mobile station 109 makes a channel status report for the first forward channel FWD_CH1 to the base station 105 illustrated in FIG. 6A as CH1 STATUS. Similarly, upon receipt of a signal over a second forward channel FWD_CH2 from a base station 107, the mobile station 109 makes a channel status report for the second forward channel FWD_CH2 to the base station 107. As described, the mobile station 109 sends first and second channel status information representing the first and second forward channels FWD_CH1 and FWD_CH2 over corresponding reverse channels, respectively.

FIGS. 7A to 7D are flowcharts illustrating the handoff method according to the first embodiment of the present invention. The first handoff method will now be described with reference to FIGS. 4 and 7A–7D.

Figure 7A:
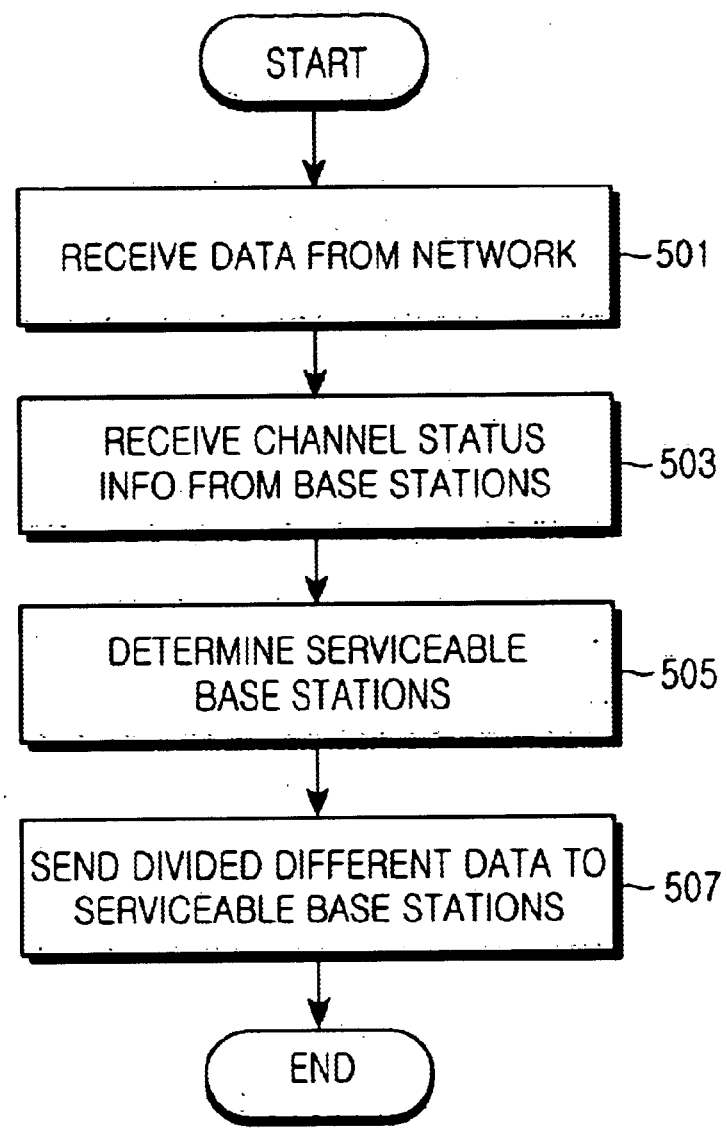
FIGS. 7A to 7D are diagrams illustrating a handoff method according to the first embodiment of the present invention, performed in a base station controller, a base station and a mobile station, respectively.
Figure 8:
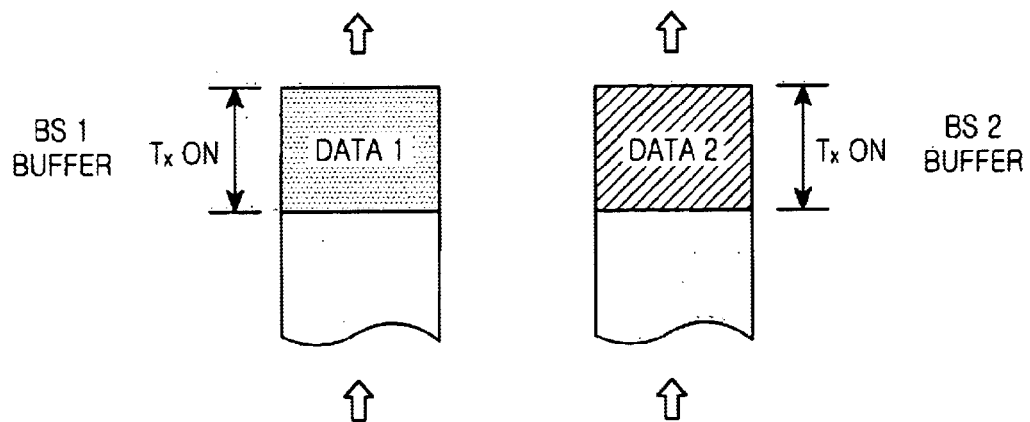
FIG. 8 is a diagram illustrating a method for transmitting the divided different data stored in buffers of two base stations according to an embodiment of the present invention.

FIG. 7A illustrates an operation of the base station controller 103, for performing the first handoff method. The base station controller 103 receives data from the network 101 in step 501. After receipt of the data, the base station controller 103 receives channel status information from the base stations belonging to a base station group where the mobile station 109, to which the data is to be transmitted, is presently located, in step 503. After that, the base station controller 103 determines which base stations can service the mobile station 109 based on the received channel status information, in step 505. After determining the base stations which can service the mobile station 109, the base station controller 103 divides the data to transmit the divided data to the serviceable base stations as shown in FIG. 4, in step 507. Here, the description has been made on the assumption that the base stations 105 and 107 are determined to be able to service the mobile station 109. In this case, buffers in the base stations 105 and 107 store the different data DATA1 and DATA2, respectively, as shown in FIG. 8. In the situation where one of the base stations 105 and 107 cannot transmit the divided data to the mobile station 109, the base station controller 103 can transmit that portion of the divided data.

Figure 7B:
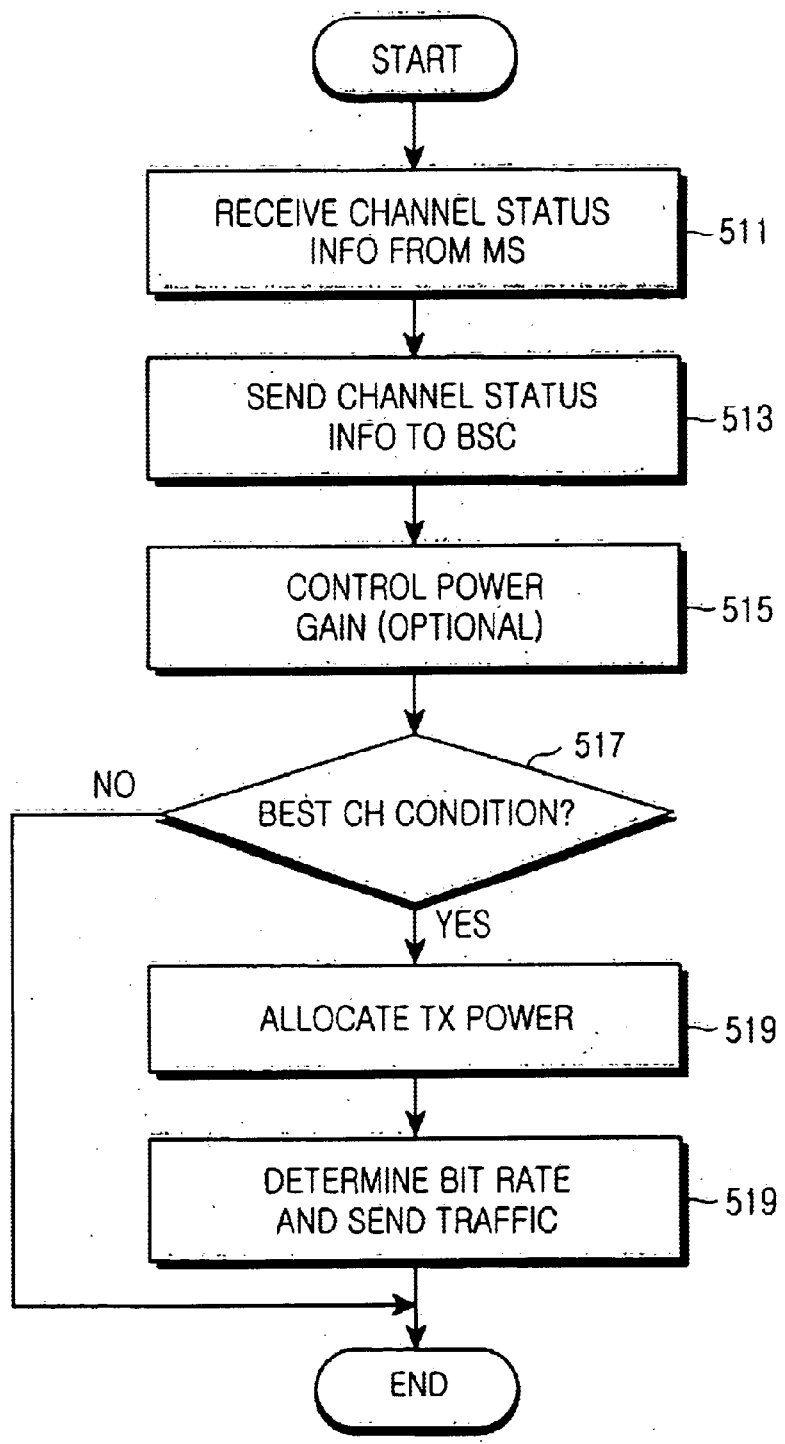

The data DATA1 and DATA2 provided to the base stations 105 and 107 from the base station controller are transmitted to the mobile station 109 in accordance with the procedure of FIG. 7B. The base station 105 constantly transmits a base station signal to the mobile station 109 over a forward channel. The base station signal can be a pilot signal, for example.

Referring to FIG. 7B, an operation of the base station will be described hereinbelow. The base station 105 receives channel status information that the mobile station 109 has transmitted in response to the base station signal, in step 511. Upon receipt of the channel status information, the base station 10s can transmit channel status information to the base station controller 103, when necessary, in step 513. The channel status information that the base station 105 transmits to the base station controller 103 can be different in form from the channel status information that the mobile station 109 transmits to the base station 105. For example, the channel status information that the base station 105 transmits to the base station controller 103 can be a message generated according to the channel condition.

At this point, a description of the operation of the base station will be provided as two embodiments.

In the first embodiment, the base station 105 can incidentally control a power gain of a traffic channel according to the channel status information (or a power control bit) in step 515. Thereafter, the base station 105 determines, in step 517, whether the mobile station 109 has the best channel condition. As the result of the determination, when the mobile station 109 is in the best channel condition, the base station 105 allocates transmission power according to the reported channel condition in step 519. After allocation of the transmission power, the base station 110 determines a bit rate in step 520, and transmits data to the mobile station 109, in step 521. However, when the mobile station 109 is not in the best channel condition, the base station 105 does not transmit the data. The base station 107 also performs the same operation to determine whether to transmit data to the mobile station 109.

Figure 7C:
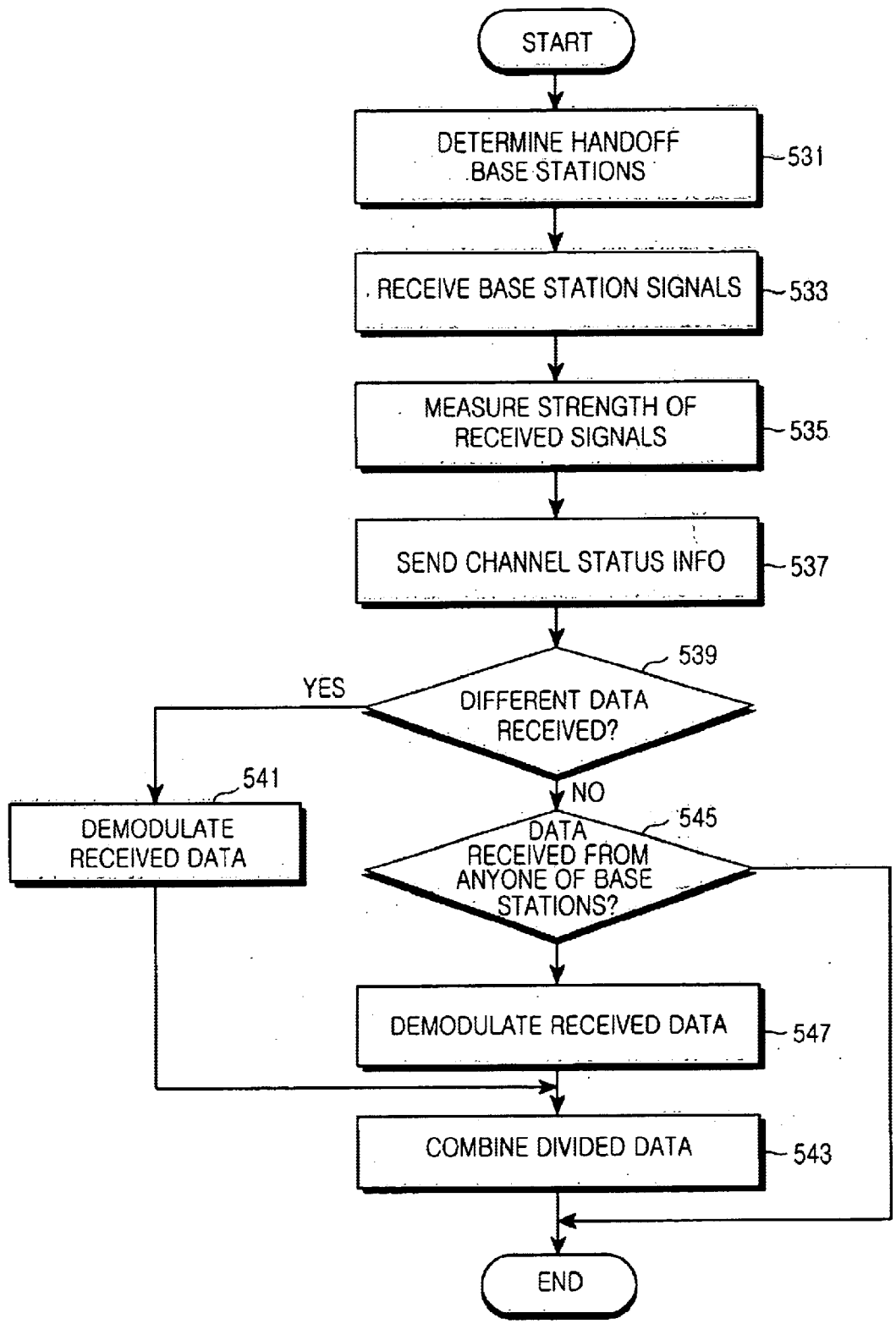
Figure 7D:
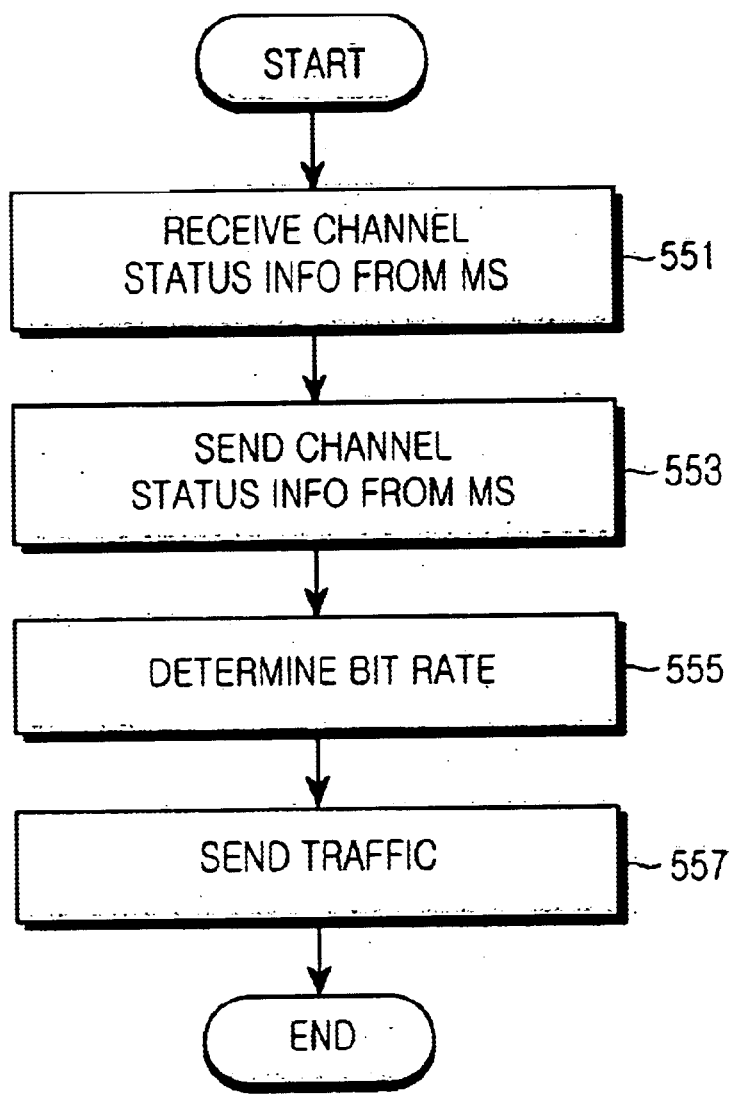

In the second embodiment, the base station 105 performs steps 551 and 553 of FIG. 7D which correspond to steps 511 and 513 of FIG. 7B. Thereafter, the base station 105 checks a channel condition for the mobile station 109 and determines a bit rate according to the channel condition for the mobile station 109, in step 555. The base station 105 then transmits data to the mobile station 109 at the determined bit rate in step 557.

FIG. 7C illustrates a data processing method during a handoff, performed in a mobile station according to an embodiment of the present invention. Referring to FIG. 7C, the mobile station 109 determines handoff base stations which can service itself, in step 531. Thereafter, the mobile station 109 receives signals from the base stations 105 and 107 over corresponding forward channels in step 533, and measures receiving power 106 (Ec/Io) for the base stations 105 and 107 in step 535. After measurement of the receiving power, the mobile station 109 transmits corresponding channel status information for the forward channels to the base stations 105 and 107, in step 537. The mobile station 109 determines in step 539 whether different data is received from the handoff base stations 105 and 107. Upon receipt of the different data that the base stations 105 and 107 has transmitted as shown in FIG. 8, the mobile station 109 demodulates the data DATA1 received from the base station 105 and the data DATA2 received from the base station 107 using the fingers of FIG. 5, in step 541. Subsequently, the mobile station 109 combines the demodulated data DATA1 and DATA2 to restore the original data transmitted from the base station controller 103. Here, the mobile station can receive bit rate information from the base stations or detect the bit rate information by itself to perform demodulation. In the meantime, when the different data is not received from the base stations 105 and 107, the mobile station 109 determines in step 545 whether data is received from any one of the base stations 105 and 107. Upon receipt of the data from any one of the base stations 105 and 107, the mobile station 109 demodulates the received data in step 547 and combines the demodulated data with the previously demodulated data in step 543. However, when data is not received from any of the base stations 105 and 107, the procedure is ended without data demodulation.

FIG. 8 illustrates a state where different data are stored in buffers of the base stations 105 and 107 during the handoff. When the channels between the mobile station 109 and the base stations 105 and 107 are both in a good condition, the base stations 105 and 107 transmit the respective data stored in the buffers thereof, as shown in FIG. 8.

However, when a channel between the mobile station 109 and one of the base stations 105 and 109 is in a bad condition, causing a delay in transmitting the data, the base station controller 103 can relay the delayed data to the other base station in the good channel condition.

Figure 9:
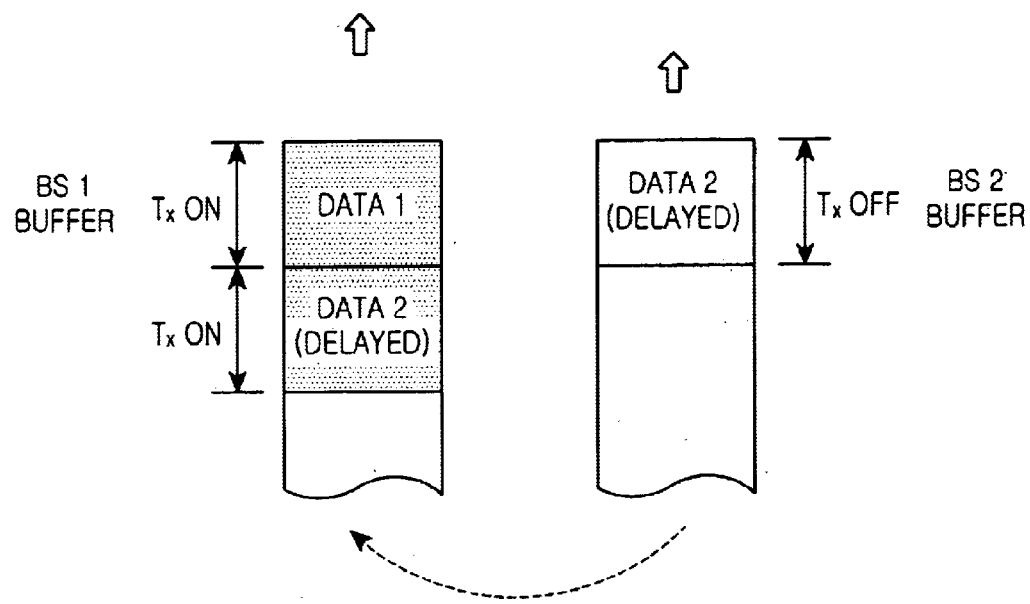
FIG. 9 is a diagram illustrating a method for relaying delayed data to a base station when another base station has a bad channel condition according to an embodiment of the present invention.

With reference to FIG. 9, a detailed description will be made regarding a data processing method for increasing data throughput during a handoff. The base stations 105 and 107 allocate power and determine bit rates at frame according to their channel conditions (in the first embodiment), or allocate fixed power and determines bit rates at every frame according to their channel conditions (in the second embodiment), to transmit the data to the mobile station 109 at the determined bit rates. Therefore, only when the channels between the mobile station and the base stations 105 and 107 are both in a good condition, i.e., only when the channels are assigned with a power value greater than zero and their bit rates are determined to be some value greater than zero, the buffers of the base stations 105 and 107 output the data to be transmitted to the mobile station 109. That is, when the two base stations 105 and 107 both have the good channel condition, the different data stored in the two base stations 105 and 107 can be simultaneously transmitted to the mobile station 109. However, there may be a situation where the first data DATA1 is normally transmitted to the mobile station 109, and the second data DATA2 is delayed due to a bad channel condition. In this situation, the base station controller 103 relays the second data DATA2 to the base station 105 in the good channel condition through a wire transmission path, as shown in FIG. 9.

A method for relaying data from a base station in a bad channel condition to a base station in a good channel condition will be described with reference to FIG. 16. The operation of the base station controller 103, the base stations 105 and 107, and the mobile station 109, in accordance with the procedure of FIG. 16, will be described with reference to FIGS. 18A to 18C. In general, either base station 105 or 107 can be in a bad channel condition with the other in the good channel condition, however, the following description will be given on the assumption that a channel between the mobile station 109 and the base station 105 is in a good condition and a channel between the mobile station 109 and the base station 107 is in a bad condition.

Figure 16:
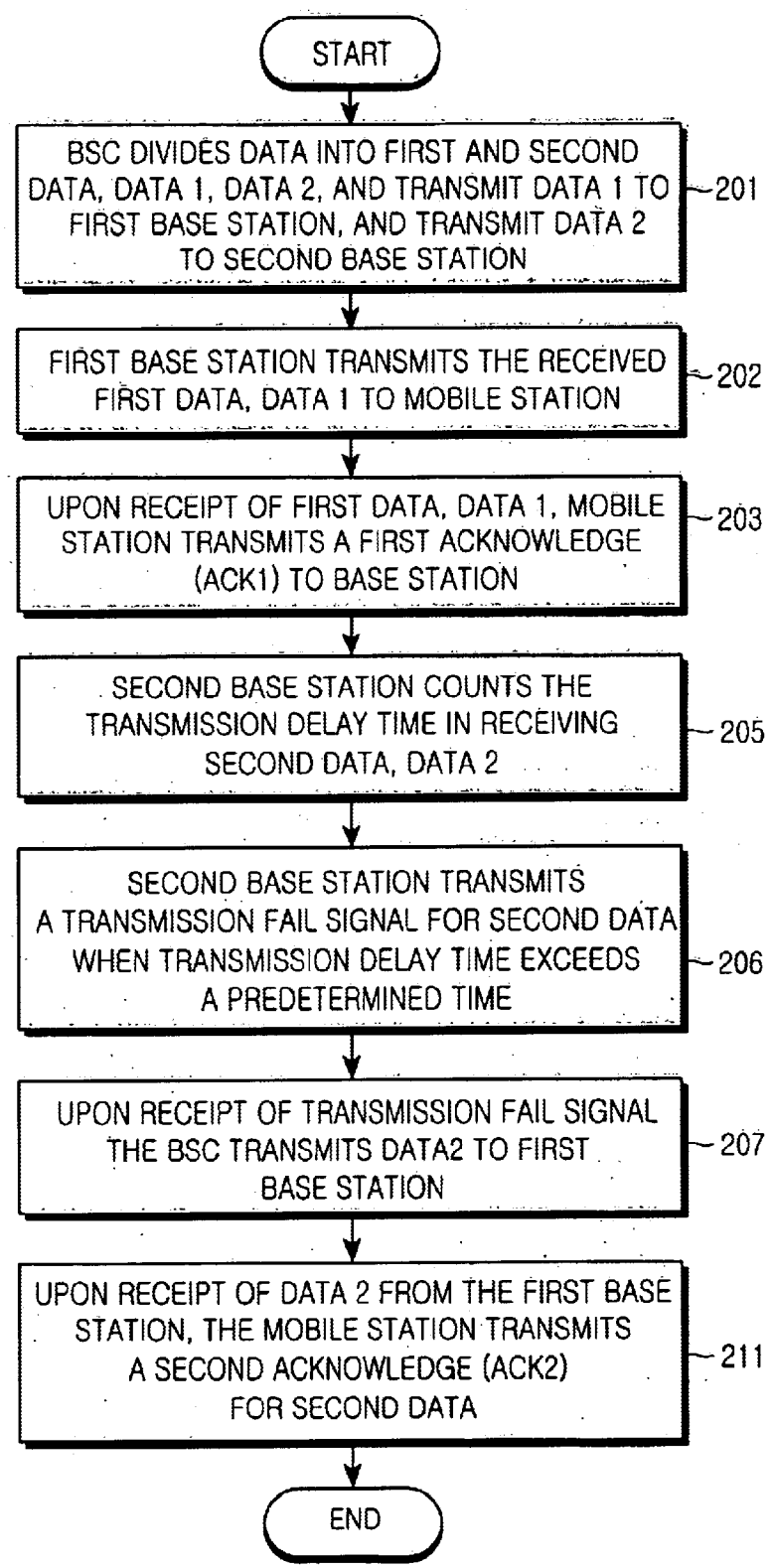
FIG. 16 is a flow chart illustrating a first method for retransmitting transmission-failed data when one of two base stations has failed to transmit the data, according to an embodiment of the present invention.

First, referring to FIG. 16, when there is data to transmit to the mobile station 109, the base station controller 103 divides the data into first and second data DATA1 and DATA2 and transmits the first data DATA1 to the base station 105 and the second data DATA2 to the base station 107, in step 201. Upon receipt of the first data DATA1 from the base station controller 103, the base station 105 can transmit the received first data DATA1 to the mobile station 109 in step 202, since the channel between the base station 105 and the mobile station 109 is in a good condition. Upon receipt of the first data DATA1 from the base station 105, the mobile station 109 transmits a first acknowledge (ACK1) for the first data DATA1 to the base station 105 in step 203. Upon receipt of the first acknowledge from the mobile station 109, the base station 105 provides the first acknowledge to the base station controller 103.

However, the second data DATA2 transmitted to the base station 107 undergoes transmission delay as shown in FIG. 9, since the channel between the base station 107 and the mobile station 109 is in a bad condition. The base station 107 counts the transmission delay time in step 205. When the transmission delay time exceeds a predetermined time, the base station 107 transmits a transmission fail signal for the second data DATA2 to the base station controller 103 in step 206.

Upon receipt of the transmission fail signal from the base station 107, the base station controller 103 transmits the second data DATA2 to the base station 105 in the good channel condition, in step 207. The base station 105 then transmits the received second data DATA2 to the mobile station 109 in step 209. Upon receipt of the second data DATA2 from the base station 105, the mobile station 109 transmits a second acknowledge (ACK2) for the second data DATA2 to the base station 105 in step 211. Upon receipt of the second acknowledge, the base station 105 transmits the second acknowledge to the base station controller 103.

Figure 18A:
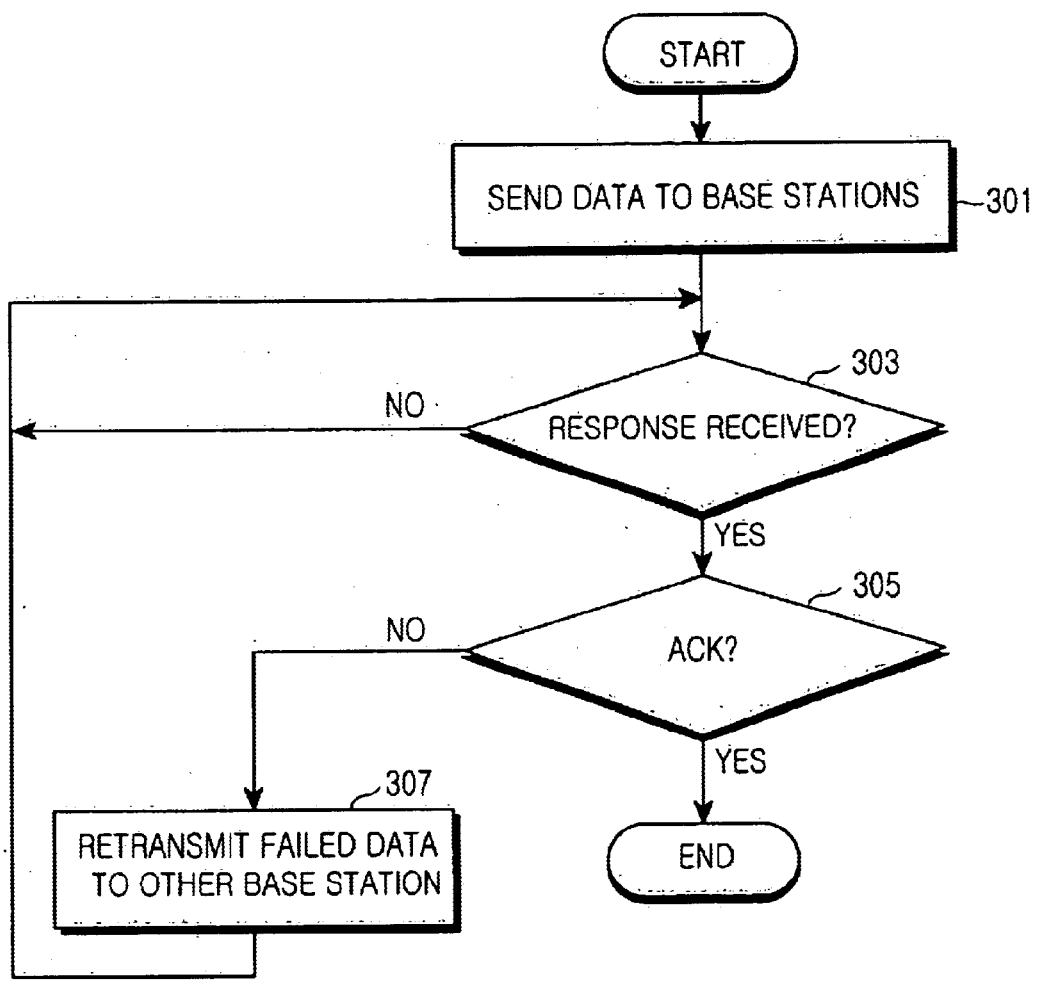
FIGS. 18A to 18C are flow charts illustrating the first data retransmission method of FIG. 16, performed in a base station controller, a base station and a mobile station, respectively.

With reference to FIG. 18A, a description will be made regarding an operation of the base station controller 103, performed in accordance with the procedure of FIG. 16. When there is data to transmit to the mobile station 109, the base station controller 103 divides the data into first and second data streams (i.e., DATA1 and DATA2), and transmits the divided first and second data streams DATA1 and DATA2 to the base stations 105 and 107, respectively, in step 301. After data transmission, the base station controller 103 determines, in step 303 whether a response signal (i.e., ACK or NACK) is received from the base stations 105 and 107. Upon receipt of the response signal, the base station controller 103 determines in step 305 whether the response signal is an acknowledge (ACK). When the response signal is the acknowledge signal (ACK), the base station controller 103 stops data transmission; otherwise, when the response signal is a NACK (i.e., not acknowledge), the base station controller 103 retransmits the transmission failed data to the other base station in the good channel condition.

Figure 18B:
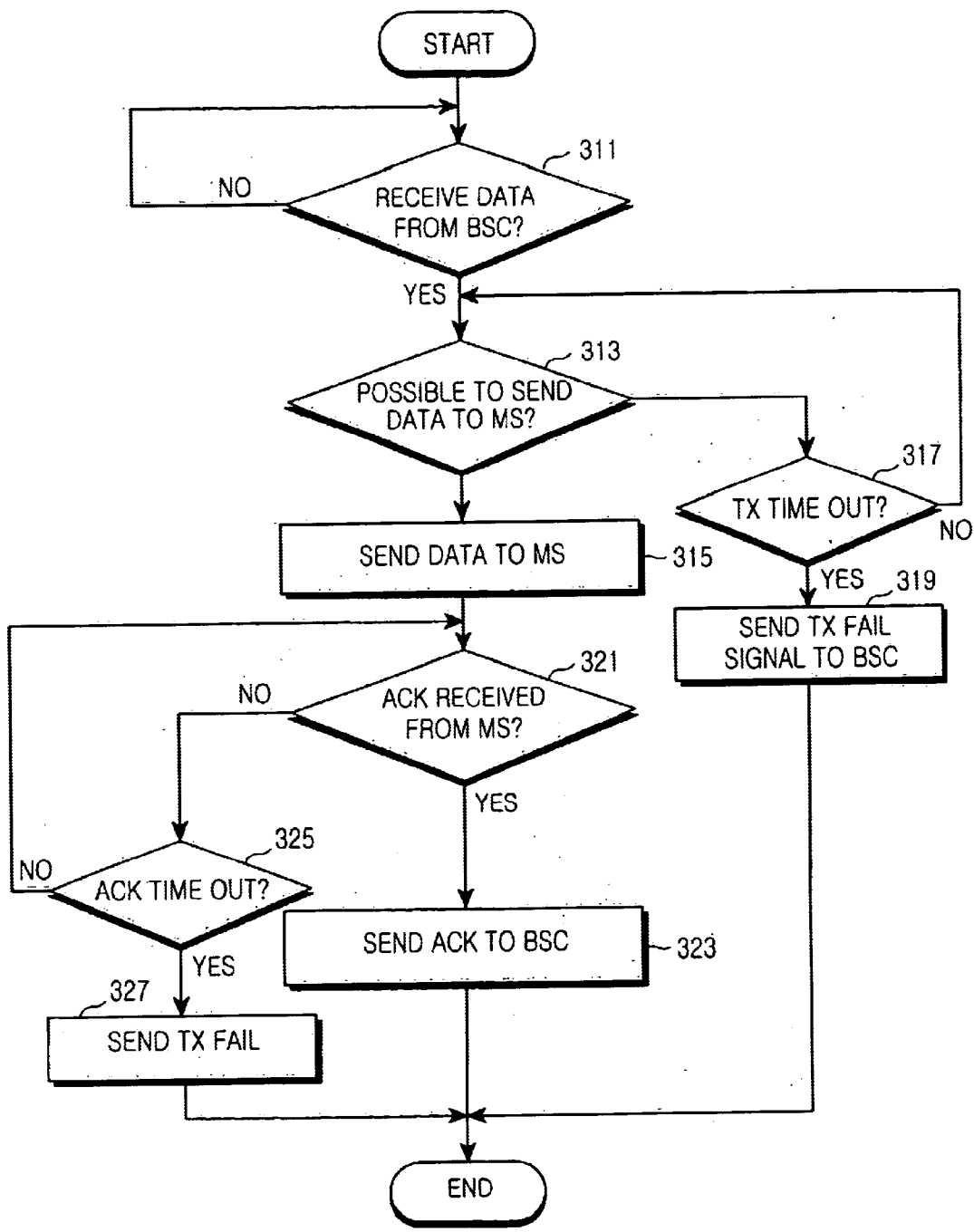

With reference to FIG. 18B, a description will be made regarding an operation of the base station, performed in accordance with the procedure of FIG. 16. In step 311, the base station examines whether data is received from the base station controller 103. Upon receipt of the data from the base station controller 103, the base station judges in step 313 whether it is possible to transmit the data to the mobile station 109. This judgement is made based on the channel condition and the QoS as described with reference to FIGS. 1 and 2. As the result of the judgement, when it is possible to transmit the data to the mobile station 109, the base station transmits the data to the mobile station 109 in step 315.

However, when it is not possible to transmit the data to the mobile station 109, the base station determines in step 317 whether the transmission delay time exceeds a normal data transmission time. When the transmission delay time exceeds the normal data transmission time, the base station transmits a transmission fail signal to the base station controller 103 in step 319.

After transmitting the data to the mobile station 109 in step 315, the base station examines in step 321 whether an acknowledge (ACK) is received from the mobile station 109. Upon receipt of the acknowledge from the mobile station 109, the base station transmits the acknowledge to the base station controller 103 in step 323. Upon failure to receive the acknowledge, the base station determines in step 325 whether a normal acknowledge time has lapsed. After a lapse of the normal acknowledge time, the base station transmits a transmission fail signal to the base station controller 103 in step 327.

Figure 18C:
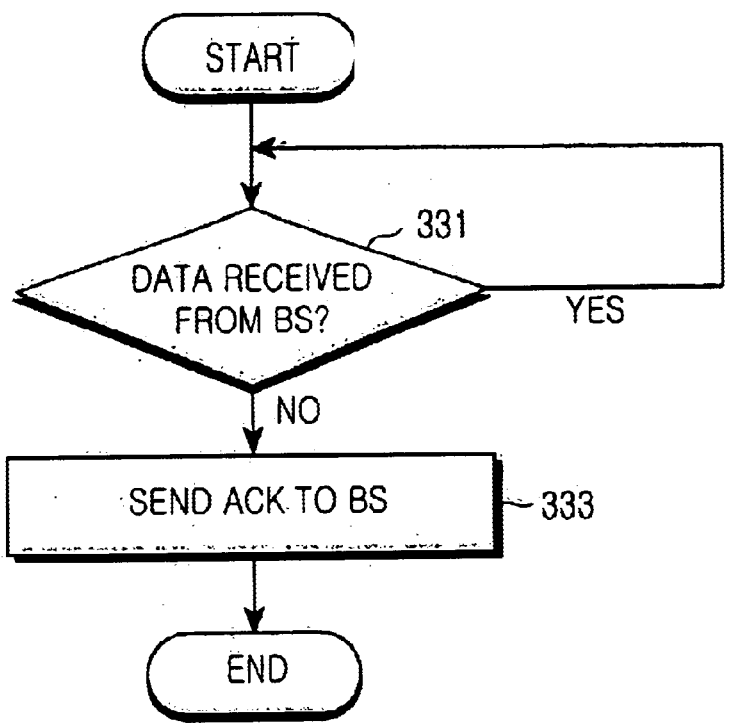

With reference to FIG. 18C, a description will be made regarding an operation of the mobile station 109, performed in accordance with the procedure of FIG. 16, the mobile station 109 determines in step 331 whether the divided data is received from the base station. Upon receipt of the divided data from the base station, the mobile station 109 transmits an acknowledge to the base station in step 333.

Figure 10:
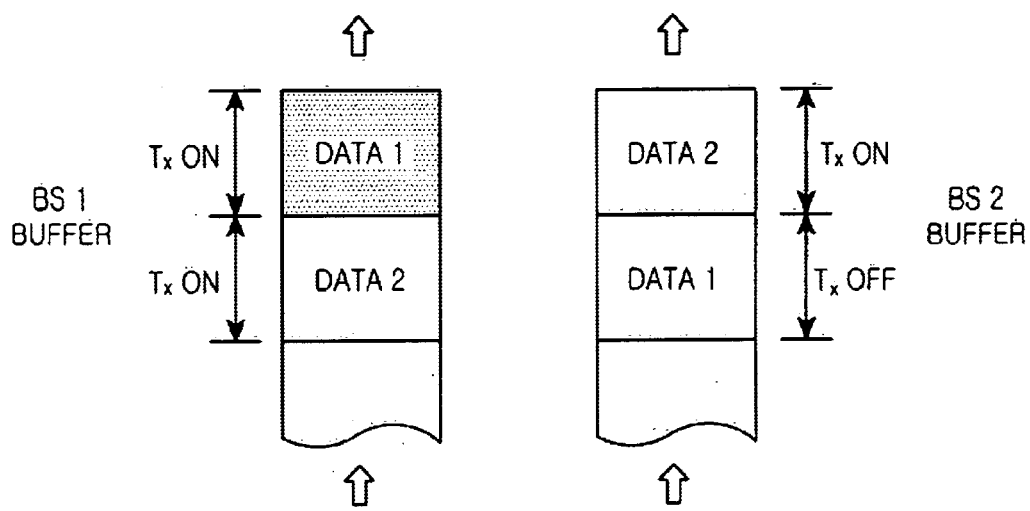
FIG. 10 is a diagram illustrating a method for transmitting opposite data in reserve, providing for a case where one of the base stations is in a bad channel condition, according to an embodiment of the present invention.

In an alternate embodiment, the base station controller 103 sends overlapped data to more than two base stations, and determines the transmission order of the respective base stations whereby the transmission order allows the base station having the better channel condition to transmit first. That is, as shown in FIG. 10, the base station 105 is provided with the second data DATA2 in reserve following the first data DATA1, and the base station 107 is provided with the first data DATA1 in reserve following the second data DATA2. When transmission of the first data DATA1 is first completed, the base station 105 successively transmits the second data DATA2; when transmission of the second data DATA2 is first completed, the base station 107 successively transmits the first data DATA1. Therefore, the buffers of the base stations 105 and 107 store both the first and second data DATA1 and DATA2, providing for the case where the other base station fails to transmit the data to the mobile station 109. If the base station 107 fails to transmit the second data DATA2 to the mobile station 109, the base station 105 consecutively transmits the second data DATA2 after complete transmission of the first data DATA1 and the base station 107 discards the second data DATA2 in its buffer.

Figure 17:
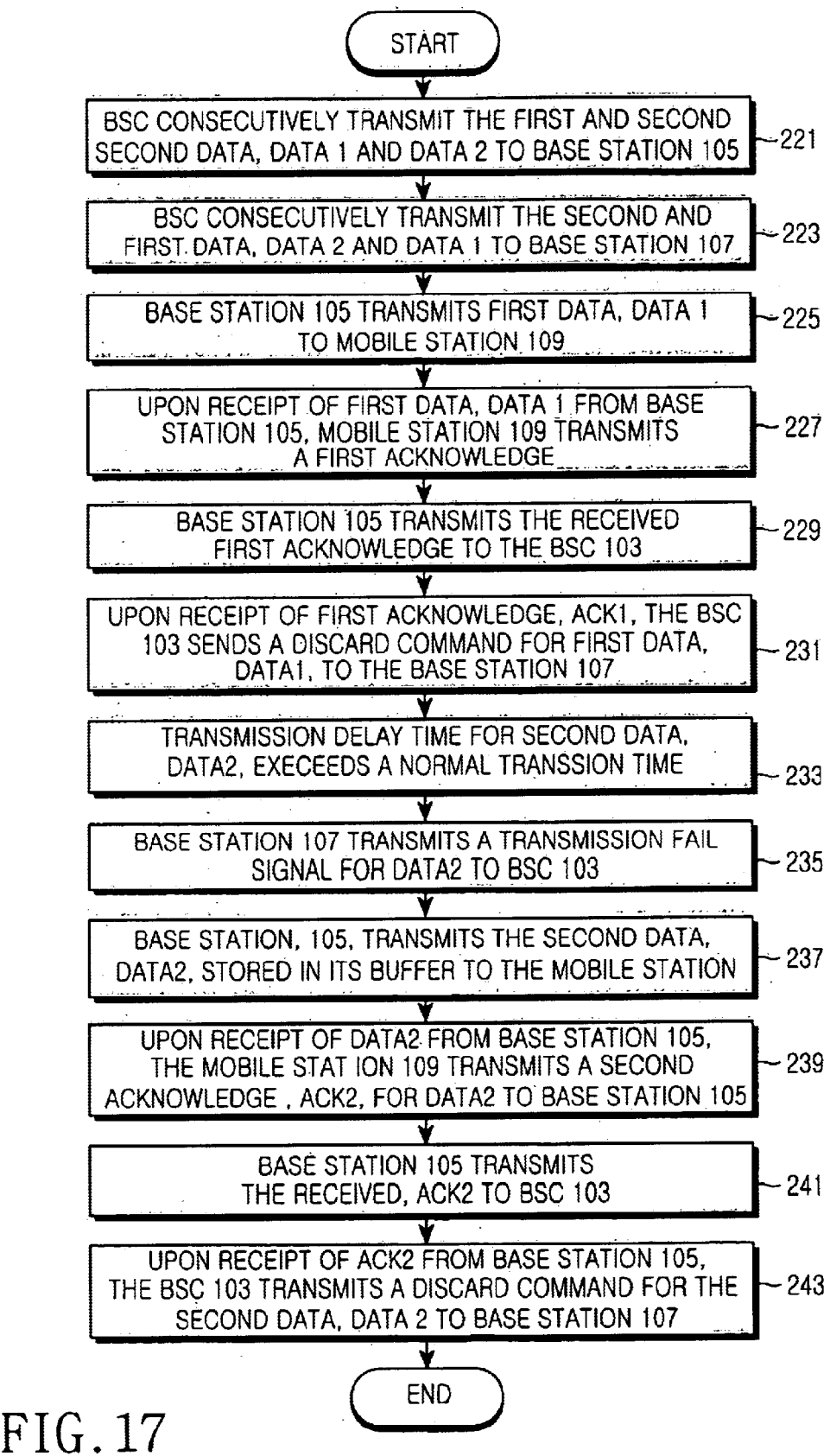
FIG. 17 is a flow chart illustrating a second method for retransmitting transmission-failed data when one of two base stations has failed to transmit the data, according to an embodiment of the present invention.

This procedure will be described in detail with reference to FIG. 17 utilizing the same assumptions made with reference to FIG. 16.

When there is data to transmit to the mobile station 109, the base station controller 103 divides the data into first and second data DATA1 and DATA2. After dividing the data, the base station controller 103 consecutively transmits the first and second data DATA1 and DATA2 to the base station 105 in step 221. Thereafter, the base station controller 103 consecutively transmits the second and first data DATA2 and DATA1 to the base station 107 in step 223. This is to provide for a situation where one of the base stations 105 and 107 cannot transmit the data to the mobile station 109. The base station 105 sequentially stores in its buffer the first and second data DATA1 and DATA2 transmitted from the base station controller 103. Since the channel formed between the base station 105 and the mobile station 109 is in a good condition, the base station 105 first transmits the first data DATA1, which was first received out of the first and second data DATA1 and DATA2, to the mobile station 109 in step 225. Upon receipt of the first data DATA1 from the base station 105, the mobile station 209 transmits a first acknowledge for the first data DATA1 to the base station 105 in step 227. The base station 105 then transmits the received first acknowledge to the base station controller 103 in step 229. Upon receipt of the first acknowledge, the base station controller 103 sends a discard command for the first data DATA1 to the base station 107 in step 231, since the first data DATA1 was successfully transmitted to the mobile station 109. The base station 107 then discards the first data DATA1 stored in its buffer. Further, the base station 107 in the bad channel condition cannot transmit the second data DATA2, causing a delay in transmitting the second data DATA2. When a transmission delay time for the second data DATA2 exceeds a normal transmission time in step 233, the base station 107 transmits a transmission fail signal for the second data DATA2 to the base station controller 103 in step 235.

Although the second base station 107 failed to transmit the second data DATA2, since the base station 105 has the second data DATA2 stored in its buffer, the base station 105 can transmit the second data DATA2 to the mobile station 109 in step 237 after transmission of the first data DATA1 in step 225. Upon receipt of the second data DATA2 from the base station 105, the mobile station 109 transmits a second acknowledge for the second data DATA2 to the base station 105 in step 239. The base station 105 then transmits the received second acknowledge to the base station controller 103 in step 241. Upon receipt of the second acknowledge from the base station 105, the base station controller 103 transmits a discard command for the second data DATA2 to the base station 107 in step 243. The base station 107 then discards the second data DATA2 stored in its buffer in response to the discard command.

Figure 11:
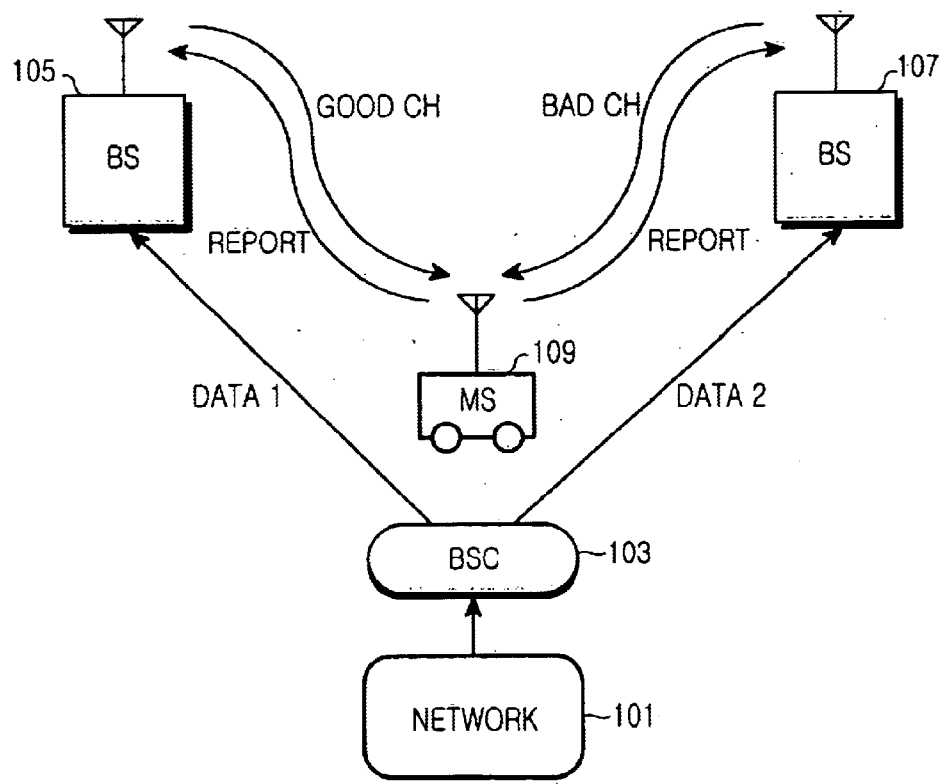
FIG. 11 is a diagram illustrating a handoff method in which the same data are transmitted to two base stations according to a second embodiment of the present invention.

In the handoff method according to the second embodiment, as illustrated in FIG. 11, when the base station controller 103 receives data to transmit to the mobile station 109 from the network 101, the base station controller 103 transmits the same data by duplicating it to more than two base stations. The mobile station 109 can transmit to the base stations a best link indicator for base station selection together with the channel status information at every frame.

Figure 12:
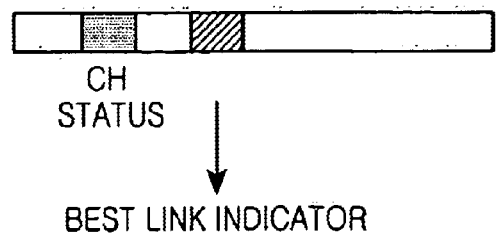
FIG. 12 is a diagram illustrating a structure of a frame that a mobile station transmits to a base station over a reverse channel for channel status reporting according to an embodiment of the present invention.

FIG. 12 illustrates a structure of a frame that the mobile station transmits to the base station over a reverse channel for channel status reporting. As illustrated, each frame includes a channel status indicator and a best link indicator. The best link indicator indicates a best base station, a signal from which has the highest power at the mobile station 109. The base station designated by the best link indicator can transmit data to the mobile station 109 for one frame. The other non-designated base stations stop transmitting data for this frame.

Figure 13:
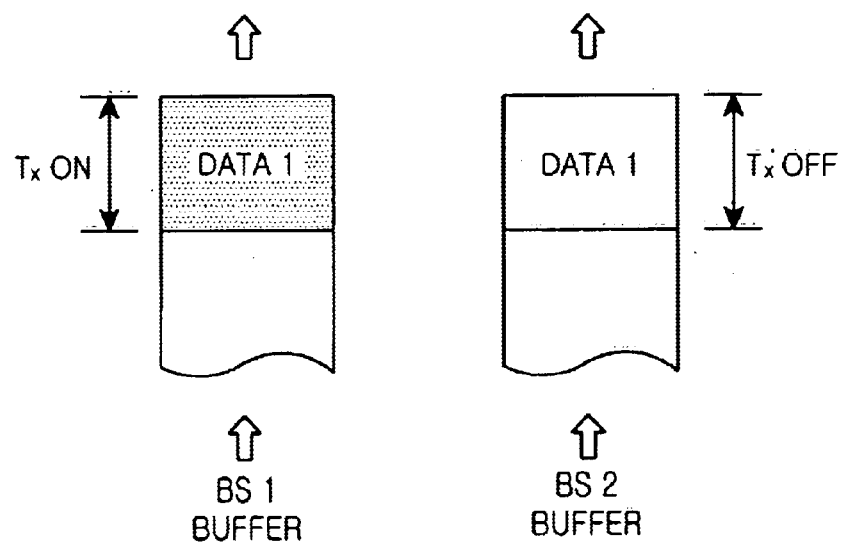
FIG. 13 is a diagram illustrating a method for transmitting the same data stored in buffers of two base stations according to an embodiment of the present invention.
Figure 14:
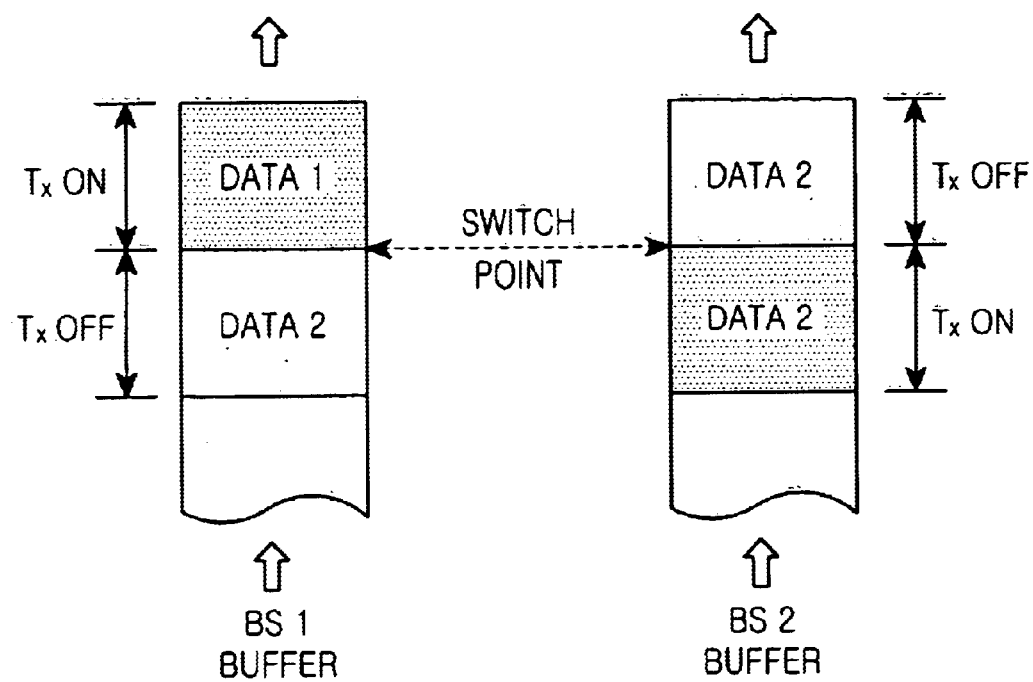
FIG. 14 is a diagram illustrating a method for detecting a data transmitting point according to an embodiment of the present invention.

FIG. 13 illustrates a method for transmitting data stored in buffers of the base stations 105 and 107 when the same data is transmitted to the base stations 105 and 107. In FIG. 13, the base station 105 designated by the best link indicator from the mobile station 109 transmits the first data DATA1 and the non-designated base station 107 does not transmit the data. The non-designated base station 107 updates information about a present data transmitting point, i.e., information as to which data is to be transmitted next (see FIG. 14). This information can be provided to the respective base stations from the mobile station 109, or can be exchanged between the base stations through a wire path (e.g., base station 105⇄base station controller 103⇄base station 107). In transmitting channel status information to more than two base stations, the mobile station 109 can either separately transmit the channel status information to the respective base stations, or combine the channel status information for the respective base stations to transmit the combined channel status information over the same channel. In the latter method, the mobile station 109 transmits the channel status information for the different base stations over a single channel. To do so, the mobile station 109 spreads the respective channel status information with a code for distinguishing a corresponding base station and then spreads it with the same channel separation code.

Figure 15A:
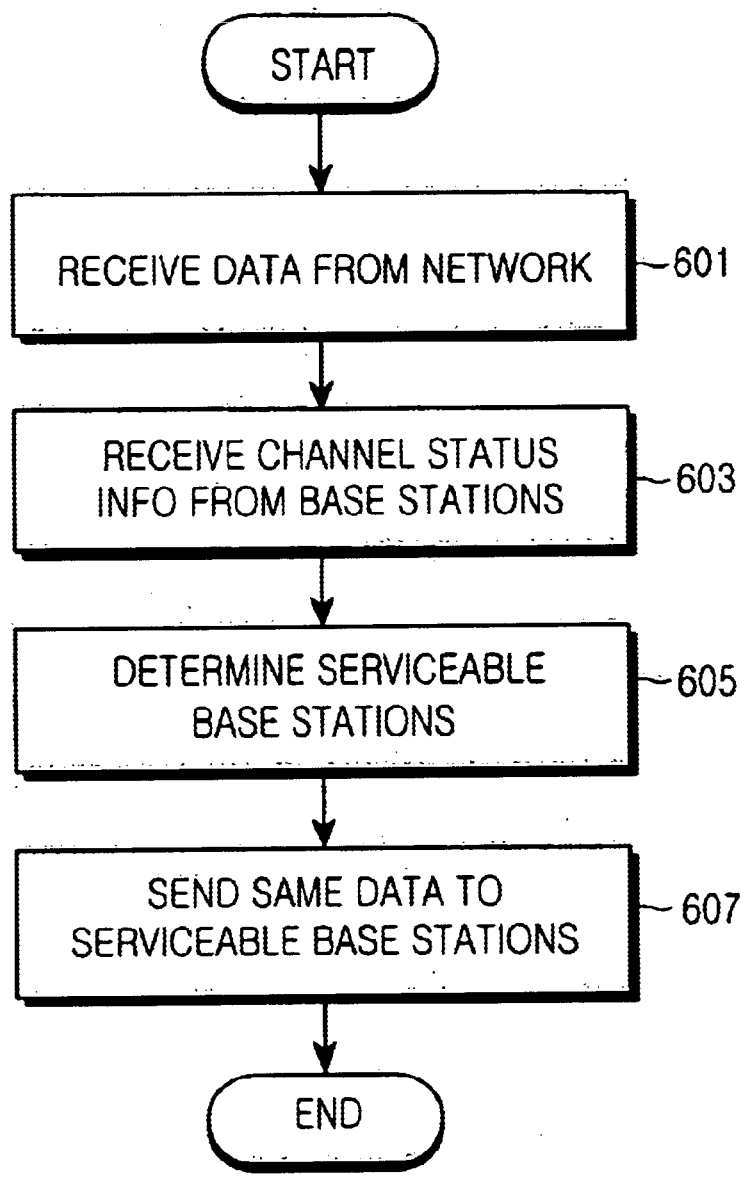
FIGS. 15A to 15C are flow charts illustrating a handoff method for transmitting the same data to at least two base station according to an embodiment of the present invention.
Figure 15B:
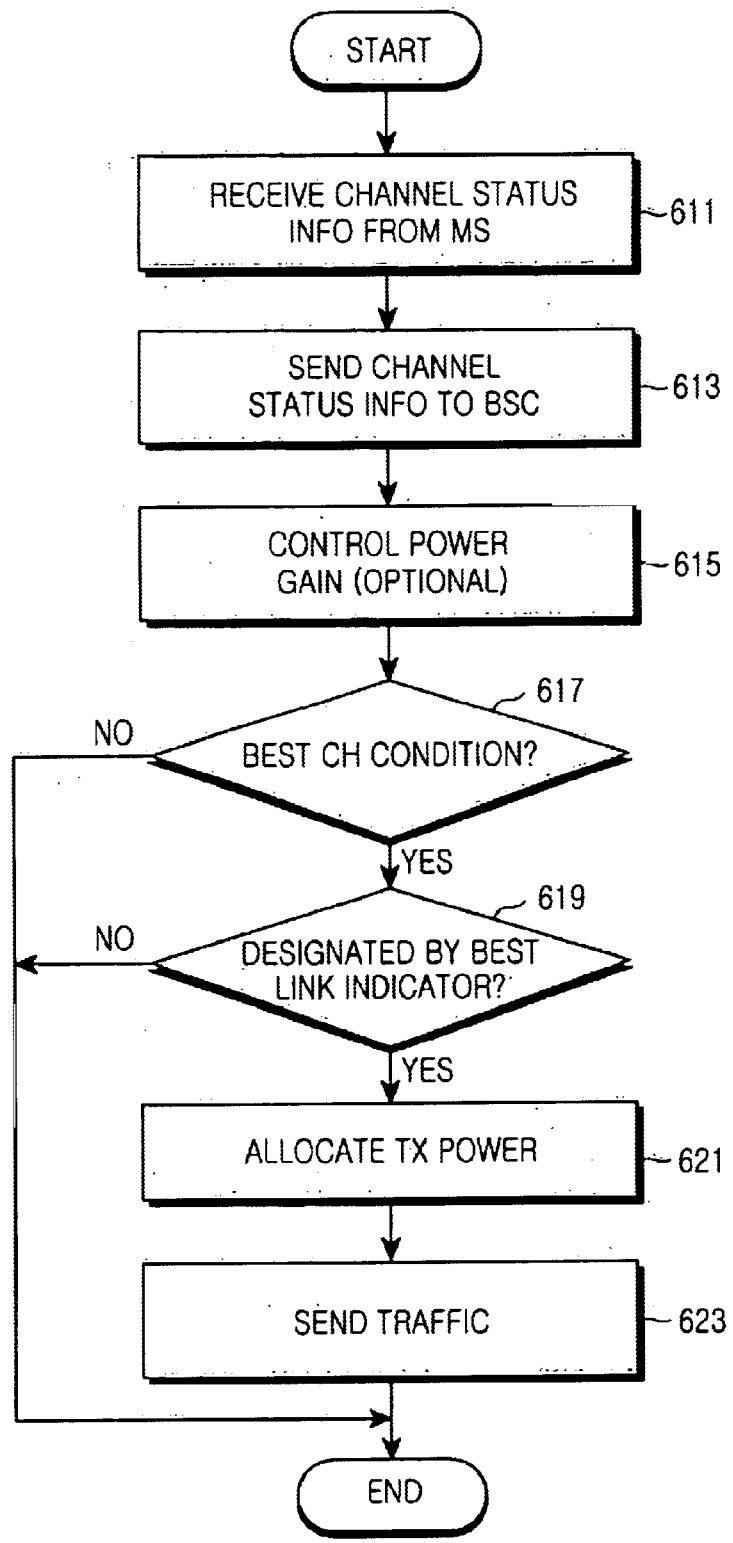
Figure 15C:
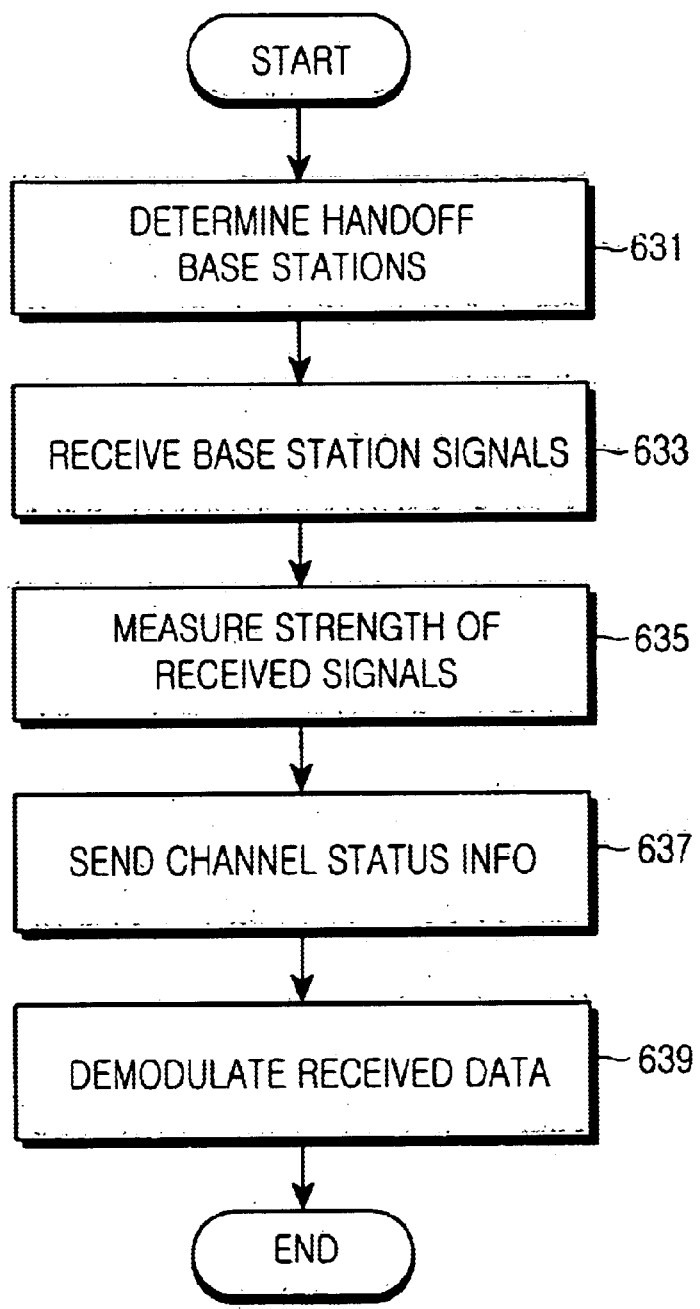

FIGS. 15A to 15C illustrate the handoff method according to the second embodiment. The second handoff method of FIGS. 15A to 15C will be described with reference to FIG. 11.

FIG. 15A illustrates the second handoff method performed in the base station controller 103. Referring to FIG. 15A, the base station controller 103 receives data from the network 101 in step 601. After receiving the data from the network 101, the base station controller 103 receives channel status information from the base stations 105 and 107 in step 603. Thereafter, the base station controller 103 determines those base stations 105 and 107 which can transmit the data to the mobile station 109 (i.e., serviceable base stations), based on the channel status information received from the base stations 105 and 107, in step 605. After determining the base stations 105 and 107 which can transmit the data to the mobile station 109, the base station controller 103 transmits the data to the serviceable base stations 105 and 107 in step 607. Here, the data transmitted to the base stations 105 and 107 is the same data duplicated.

FIG. 15B illustrates the second handoff method performed in the base station 105 or 107. A description will now be made regarding how the base station 105 or 107 processes the data transmitted from the base station controller 103.

Referring to FIG. 15B, the base station receives a channel status report from the mobile station 109 in step 611. The base station can transmit channel status information to the base station controller 103 when necessary, in step 613. Further, the base station can incidentally control a power gain of a traffic channel according to the received channel status information (or power control bit) in step 615. Next, the base station determines in step 617 whether a channel between the base station and the mobile station 109 is in the best condition. When the mobile station 109 has the best channel condition, the base station examines in step 619 whether the base station itself is designated by the best link indicator. As the result of the examination, if it is examined that the base station itself is designated by the best link indicator, the base station allocates transmission power for data transmission to the mobile station 109 in step 621, and transmits the data to the mobile station 109 in step 623. However, when the mobile station 109 does not have the best channel condition or when the base station itself is not designated by the best link indicator, the base station does not transmit the data to the mobile station.

FIG. 15C illustrates the second handoff method performed in the mobile station. Referring to FIG. 15C, the mobile station 109 determines the handoff base stations which can provide services to itself, in step 631. After determining the handoff base stations, the mobile station 109 receives signals from the determined base stations in step 633, and measures receiving strengths for the respective base stations in step 635. Thereafter, in step 637, the mobile station 109 transmits channel status information to the respective base stations based on the channel measurement. Further, the mobile station 109 transmits a best link indicator for designating a base station having the best channel condition, together with the channel status information. Subsequently, the mobile station 109 receives data from the base stations and demodulates the received data in step 639.

For example, the mobile station 109 determines the base stations 105 and 107 which can provide services to itself in step 631, and receives base station signals from any one of or from both of the base stations 105 and 107 over the corresponding forward channels in step 633. Upon receipt of the signals, the mobile station 109 measures strengths of the signals received from the base stations 105 and 107 in step 635, and transmits channel status information to the base stations 105 and 107 based on the measurements in step 637. Here, the mobile station 109 transmits a best link indicator to the base station 105 in the best channel condition, together with the channel status information. After channel status reporting, the mobile station 109 demodulates the data received from a base station previously designated as the base station, in step 639.

As described above, during a handoff, data is transmitted according to priority determined depending on the channel condition and the QoS, maximizing data throughput for the packet service. Further, a base station inserts a rate indicator of service data in the service data to transmit the rate indicator, so that a mobile station can rapidly adapt to the variable bit rate to demodulate received data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A packet data processing device, for maximizing throughput of packet data transmitted over forward channels for use in a base station in a code division multiple access (CDMA) mobile communication system for transmitting packet data over forward channels corresponding to each of a plurality of mobile stations, the device comprising:

a channel status information receiver for receiving from each of said plurality of mobile stations channel status information for said forward channels;

a supplemental channel transmission controller for allocating available maximum power in said base station based on a forward channel having a best channel condition among said forward channels corresponding to each of said plurality of mobile stations and determining a transmission bit rate of data based on the allocated maximum power; and a supplemental channel transmitter for transmitting packet data over said forward channel having the best channel condition at the determined bit rate.

2. The packet data processing device as claimed in claim 1, further comprising a rate indicator transmitter for generating a rate indicator indicating information about the determined bit rate and transmitting the generated rate indicator over said forward channel having the best channel condition.

3. The packet data processing device as claimed in claim 2, wherein the supplemental channel transmitter generates a rate indicator having information about the determined bit rate, and inserts the rate indicator in transmission data at a given location within a frame transmitted over the forward channel having the best channel condition.

4. The packet data processing device as claimed in claim 1, wherein said base station allocates entire powers to a mobile station that a power value for sending data at 1 Kbps is minimum.

5. The packet data processing device as claimed in claim 4, wherein said base station multiplies a weighting factor based on service characteristic of a mobile station by a bit rate according to said channel status information and allocates powers to a mobile station so that the multiplied transmission bit rate becomes maximum.

6. The packet data processing device as claimed in claim 1, wherein the transmission bit rate is inversely proportional to the channel status information representing strength of a pilot signal received from the mobile station and is directly proportional to fixed power.

7. The packet data processing device as claimed in claim 1, further comprising a rate indicator transmitter for generating a rate indicator representing information about the determined rate indicator and transmitting the generated rate indicator over a separate channel.

8. A packet data processing method for maximizing throughput of packet data transmitted over forward channels in a base station in a CDMA communication system transmitting packet data over forward channels corresponding to each of a plurality of mobile stations, comprising the steps of:

receiving channel status information for the forward channel from each of said plurality of mobile stations allocating available maximum power in said base station based on a forward channel having a best channel condition of said forward channels corresponding to each of said plurality of mobile stations according to the received channel status information and determining a transmission bit rate of data according to the allocated maximum power; and transmitting packet data over said forward channel having the best channel condition at the determined bit rate.

9. The packet data processing method as claimed in claim 8, wherein the forward channel is a traffic channel.

10. The packet data processing method as claimed in claim 8, wherein said base station allocates entire powers to a mobile station that a power value for sending data at 1 Kbps is minimum.

11. The packet processing method as claimed in claim 10, wherein the bit rate is given by $$\sum_{i=1}^{N} BR(i)P_b^R(i) = P_T$$

$$\text{Maximize}\left(\sum_{i=1}^{N} BR(i)\right)$$

wherein BR(i) represents a bit rate for a mobile station, $P_b^R(i)$ represents power required to send data at 1 Kbps, and $P_T$ represents a total transmission power of a base station.

12. The packet data processing method as claimed in claim 8, wherein said base station multiplies a weighting factor depending on service characteristic of a mobile station by a bit rate according to said channel status information and allocates powers to a mobile station so that the transmission bit rate becomes maximum.

13. The packet processing method as claimed in claims 12, wherein the bit rate is given by $$\sum_{i=1}^{N} BR(i)P_b^R(i) = P_T$$

-continued $$\text{Maximize}\left(\sum_{i=1}^{N} w(i)BR(i)\right)$$

wherein w(i) represents a weighting factor, BR(i) represents a bit rate for a mobile station, $P_b^R(i)$ represents power required to send data at 1 Kbps, and $P_T$ represents a total transmission power of a base station.

14. The packet data processing method as claimed in claim 8, wherein the data bit rate is determined by the strength of a common pilot signal and multiplication of a predetermined constant which are inversely proportional to a fixed power allocated to said plurality of mobile stations and the accumulated value of the power control bits contained in said channel status information received for one frame period from each of said plurality of mobile stations.

15. The packet data processing method as claimed in claim 14, wherein the bit rate is given by Par Bit Rate=K·(power)·(strength of a common pilot signal) where K is a constant.

16. The packet data processing method as claimed in claim 8, further comprising the step of generating a rate indicator indicating information about the transmission bit rate and transmitting the generated rate indicator over a forward channel in the best channel condition.

17. The packet data processing method as claimed in claim 16, wherein a primitive Walsh code is transmitted to the mobile station along with the rate indicator when the determined bit rate is a maximum bit rate, said primitive Walsh code is otherwise repeated by transmitted N times when the determined bit rate is 1/N the maximum bit rate; and wherein said base station previously assigns a primitive Walsh code used for the highest data bit rate to said plurality of mobile stations, and generates repetitive pattern information of said primitive Walsh code determined by said determined data bit rate as said rate indicator.

* * * * *